US011265892B2

(12) United States Patent
Shi et al.

(10) Patent No.: US 11,265,892 B2
(45) Date of Patent: Mar. 1, 2022

(54) DATA TRANSMISSION METHOD AND DEVICE

(71) Applicant: Huawei Technologies Co., Ltd., Shenzhen (CN)

(72) Inventors: Xiaoli Shi, Shanghai (CN); Yada Huang, Shanghai (CN); Yaqi Zhao, Shenzhen (CN); Guohua Zhou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 50 days.

(21) Appl. No.: 16/785,140

(22) Filed: Feb. 7, 2020

(65) Prior Publication Data

US 2020/0178271 A1 Jun. 4, 2020

Related U.S. Application Data

(63) Continuation of application No. PCT/CN2018/099579, filed on Aug. 9, 2018.

(30) Foreign Application Priority Data

Aug. 9, 2017 (CN) .......................... 201710679865.9

(51) Int. Cl.
*H04W 72/12* (2009.01)
*H04L 1/00* (2006.01)
(Continued)

(52) U.S. Cl.
CPC ....... *H04W 72/1257* (2013.01); *H04L 1/0003* (2013.01); *H04W 4/06* (2013.01);
(Continued)

(58) Field of Classification Search
CPC . H04W 72/1257; H04W 4/06; H04W 56/001; H04W 56/005; H04W 72/0453; H04W 88/16; H04L 1/0003
See application file for complete search history.

(56) References Cited

U.S. PATENT DOCUMENTS

2011/0268007 A1 11/2011 Barany et al.
2012/0176884 A1* 7/2012 Zhang ................. H04W 72/042
370/203

(Continued)

FOREIGN PATENT DOCUMENTS

| CN | 1996915 A | 7/2007 |
| CN | 102668664 A | 9/2012 |

(Continued)

OTHER PUBLICATIONS

"Telecom Italia vision and requirements on 5G," 3GPPRAN—workshop on 5G, RWS-150041, pp. 1-11, Phoenix, USA (Sep. 17-18, 2015).

*Primary Examiner* — Eric Myers
(74) *Attorney, Agent, or Firm* — Leydig, Voit & Mayer, Ltd.

(57) ABSTRACT

This application discloses a data transmission method and device to improve transmission efficiency of terminal data. The method of the embodiments of this application includes: receiving, by a second base station, a first message from a first base station, where the first message is used to request the second base station to allocate a radio resource for a specific bearer, and the first message includes resource scheduling information; determining, by the second base station, based on the resource scheduling information, a resource location of the radio resource and scheduling the radio resource; and sending, by the second base station, a first response message in response to the first message to the first base station.

18 Claims, 12 Drawing Sheets

(51) Int. Cl.
*H04W 4/06* (2009.01)
*H04W 56/00* (2009.01)
*H04W 72/04* (2009.01)
*H04W 88/16* (2009.01)

(52) U.S. Cl.
CPC ....... *H04W 56/001* (2013.01); *H04W 56/005* (2013.01); *H04W 72/0453* (2013.01); *H04W 88/16* (2013.01)

(56) References Cited

U.S. PATENT DOCUMENTS

| | | |
|---|---|---|
| 2013/0088979 A1 | 4/2013 | Bi et al. |
| 2013/0196678 A1 | 8/2013 | Liu et al. |
| 2015/0124748 A1 | 5/2015 | Park et al. |
| 2015/0133137 A1 | 5/2015 | Lee et al. |
| 2015/0358989 A1 | 12/2015 | Ni et al. |
| 2017/0163393 A1 | 6/2017 | Sun et al. |
| 2018/0220303 A1 | 8/2018 | Futaki |
| 2018/0279390 A1 | 9/2018 | Zhang |
| 2019/0159086 A1* | 5/2019 | Xu .................. H04W 36/08 |

FOREIGN PATENT DOCUMENTS

| | | |
|---|---|---|
| CN | 103945556 A | 7/2014 |
| CN | 104955152 A | 9/2015 |
| CN | 105659688 A | 6/2016 |
| CN | 105682241 A | 6/2016 |
| CN | 106559916 A | 4/2017 |
| CN | 106717086 A | 5/2017 |

* cited by examiner

DATA TRANSMISSION METHOD AND DEVICE

CROSS-REFERENCE TO RELATED APPLICATIONS

This application is a continuation of International Application No. PCT/CN2018/099579, filed on Aug. 9, 2018, which claims priority to Chinese Patent Application No. 201710679865.9, filed on Aug. 9, 2017. The disclosures of the aforementioned applications are hereby incorporated by reference in their entireties.

TECHNICAL FIELD

This application relates to the communications field, and in particular, to a data transmission method and device.

BACKGROUND

To avoid downlink interference, coordinated multi-point (CoMP) transmission and reception technology is used in the prior art. The CoMP technology supports coordinated transmission of cells in a base station and supports coordinated transmission of cells between base stations. In the CoMP technology, all coordinated and clustered cells are required to transmit PDSCH data to cell edge users, and the interference signal is converted into a useful signal and is utilized, so that users can increase useful signal power and reduce cell interference.

However, in the prior art, base stations need to interact scheduling resources and data every other period, and the CoMP technology between the base stations uses X2 interface for wired transmission, thereby causing an extremely large delay and greatly reducing data transmission efficiency.

SUMMARY

This application provides a data transmission method and device, configured to improve transmission efficiency of terminal data.

A first aspect of embodiments of this application provides a data transmission method, including: receiving, by a second base station, a first message sent by a first base station, where the first message is used to request the second base station to allocate a radio resource for a specific bearer, and the first message includes resource scheduling information; after receiving the first message, determining, by the second base station, based on the resource scheduling information included in the first message, a resource location of the radio resource and scheduling the radio resource; and sending, by the second base station, a first response message to the first base station, where the first response message is used to respond to the first message. In the embodiment of this application, on the basis of multi-connectivity data transmission, the second base station receives the first message of the first base station to establish a transmission resource with the terminal, and obtains the resource scheduling information preset by a first terminal through the first message, and then determines to allocate the radio resource to the terminal, to implement multi-cell coordinated downlink transmission, thereby improving transmission efficiency of terminal data.

In a possible design, the data transmission method further includes: receiving, by the second base station, first time synchronization information sent by the first base station, or sending, by the second base station, the first time synchronization information to the first base station; where the first time synchronization information is used to indicate a time at which signaling transmission is started and the first time synchronization information includes a subframe index or a timestamp. In this implementation, the manner in which the first time synchronization information is shared by the first base station and the second base station is described, adding a realizable implementation to the embodiment of this application.

In a possible design, the method further includes: sending, by the second base station, a second message to a terminal, where the second message includes radio resource configuration information determined by the second base station for the terminal; receiving, by the second base station, a second response message sent by the terminal in response to the second message, where the second response message is used to indicate that the terminal has completed radio resource configuration. In this implementation, the second base station sends the second message to the terminal and receives a response sent by the terminal, optimizing steps of the embodiment of this application.

In a possible design, the sending, by the second base station, a second message to the terminal includes: sending, by the second base station, the second message to the terminal at a time indicated by the first time synchronization information and at the resource location of the radio resource. In this implementation, how the second base station sends the second message to the terminal is specifically refined, which increases implementability of the embodiment of this application.

In a possible design, the receiving, by the second base station, a second response message from the terminal in response to the second message includes: receiving, by the second base station, the second response message sent by the first base station, where the second response message is sent by the terminal to the first base station; or after the receiving, by the second base station, a second response message from the terminal in response to the second message, the method further includes: sending, by the second base station, the second response message to the first base station. In this implementation, manners of receiving the second response message by the second base station are described, adding realizable implementations to the embodiment of this application.

In a possible design, when a transmitted data packet is routed from the first base station to the second base station and to the terminal, the method further includes: receiving, by the second base station, the data packet sent by the first base station, where a header of the data packet includes second time synchronization information, the second time synchronization information is used to indicate a time at which the second base station starts data transmission, and the second time synchronization information includes a subframe index or a timestamp; obtaining, by the second base station, the second time synchronization information based on the data packet; and performing, by the second base station, data transmission at a time indicated by the second time synchronization information and at the resource location of the radio resource. In this implementation, the manners in which the second time synchronization information is obtained by the second base station and the data is transmitted by using the second time synchronization information in 3C architecture are described, improving steps of the embodiment of this application.

In a possible design, when a transmitted data packet is directly transmitted from a serving gateway to the second base station, the method further includes: receiving, by the second base station, a data packet from the serving gateway, where a header of the data packet includes second time synchronization information, and the second time synchronization information is generated by the serving gateway; obtaining, by the second base station, the second time synchronization information based on the data packet; and performing, by the second base station, data transmission at a time indicated by the second time synchronization information and at the resource location of the radio resource. In this implementation, the manners in which the second time synchronization information is obtained by the second base station and the data is transmitted by using the second time synchronization information in 1A architecture are described, adding a realizable scenario to the embodiment of this application.

In a possible design, when a transmitted data packet is directly transmitted from an multimedia broadcast multicast service (MBMS) gateway to the second base station, the method further includes: receiving, by the second base station, a data packet from the MBMS gateway, where a header of the data packet includes second time synchronization information, and the second time synchronization information is generated by the MBMS gateway; obtaining, by the second base station, the second time synchronization information based on the data packet; and performing, by the second base station, data transmission at a time indicated by the second time synchronization information and at the resource location of the radio resource. In this implementation, the manners in which the second time synchronization information is obtained by the second base station and the data is transmitted by using the second time synchronization information in MBMS architecture are described, adding an applicable scenario to the embodiment of this application.

In a possible design, the resource scheduling information carries a resource block (RB) sequence number or an RB location, a resource scheduling period and a modulation and coding scheme (MCS). In this implementation, the content included in the resource scheduling information is specified, so that the embodiment of this application is more operable.

In a possible design, when the first base station and the second base station belong to a same core network, the receiving, by the second base station, first message from the first base station includes: receiving, by the second base station, the first message sent by the core network, where the first message further includes identification information of the second base station, and the first message is sent by the first base station to the core network. In this implementation, transmission manner of the first base station and the second base station is provided when the first base station and the second base station cannot directly transmit signaling and data, adding an implementation scenario to the embodiment of this application.

In a possible design, when the first base station belongs to a source core network and the second base station belongs to a target core network, the receiving, by the second base station, first message from the first base station including: receiving, by the second base station, the first message sent by the target core network, where the first message further includes identification information of the second base station, and the first message is sent by the first base station to the source core network and then to the target core network. In this implementation, transmission manner of the first base station and the second base station is provided when the first base station and the second base station cannot directly transmit signaling and data and when the first base station and the second base station do not belong to the same core network, adding an implementation scenario to the embodiment of this application.

A second aspect of the embodiments of this application provides a data transmission method, including: sending, by a first base station, a first message to a second base station, where the first message is used to request the second base station to allocate a radio resource for a specific bearer, the first message includes resource scheduling information, and the resource scheduling information is used to indicate a resource location of the radio resource for the second base station; receiving, by the first base station, a first response message in response to the first message sent by the second base station, where the first response message is used to acknowledge that the radio resource has been allocated. In the embodiments of this application, on the basis of multi-connectivity data transmission, the first base station sends the first message to the second base station to establish a transmission resource with the terminal, so that the second base station obtains resource scheduling information preset by a first terminal through the first message, and then the first base station receives the first response message to determine that the second base station allocates the radio resource to the terminal, to implement multi-cell coordinated downlink transmission, thereby improving transmission efficiency of terminal data.

In a possible design, the data transmission method further includes: receiving, by the first base station, first time synchronization information sent by the second base station, or sending, by the first base station, the first time synchronization information to the second base station, where the first time synchronization information is used to indicate a time at which signaling transmission is started and the first time synchronization information includes a subframe index or a timestamp. In this implementation, the manner in which the first time synchronization information is shared by the first base station and the second base station is described, adding a realizable implementation to the embodiment of this application.

In a possible design, the method further includes: sending, by the first base station, a second message to a terminal, where the second message includes radio resource configuration information determined by the second base station for the terminal; receiving, by the first base station, a second response message from the terminal in response to the second message, where the second response message is used to indicate that the terminal has completed radio resource configuration. In this implementation, the first base station sends the second message to the terminal and receives the response sent by the terminal, optimizing steps of the embodiment of this application.

In a possible design, the sending, by the first base station, a second message to the terminal including: sending, by the first base station, the second message to the terminal at a time indicated by the first time synchronization information and at the resource location of the radio resource. In this implementation, how the first base station sends the second message to the terminal is specifically refined, increasing implementability of the embodiment of this application.

In a possible design, the receiving, by the first base station, a second response message from the terminal in response to the second message includes: receiving, by the first base station, the second response message sent by the second base station, and the second response message is sent by the terminal to the second base station; or after the receiving, by the first base station, a second response message from the terminal in response to the second message, the method further includes: sending, by the first base station, the second response message to the second base station. In this implementation, manners in which the second response message is received by the first base station are described, adding realizable implementations to the embodiment of this application.

In a possible design, when a transmitted data packet is routed from the first base station to the second base station and to the terminal, the method further includes: sending, by the first base station, the data packet to the second base station, where a header of the data packet includes second time synchronization information, the second time synchronization information is used to indicate a time at which the second base station starts data transmission, and the second time synchronization information includes a subframe index or a timestamp; and performing, by the first base station, data transmission at a time indicated by the second time synchronization information and at the resource location of the radio resource. In this implementation, the manners in which the second time synchronization information is obtained by the first base station and the data is transmitted by using the second time synchronization information in 3C architecture are described, improving steps of the embodiment of this application.

In a possible design, when a transmitted data packet is directly transmitted from a serving gateway to the second base station, the method further includes: receiving, by the first base station, a data packet from the serving gateway, where a header of the data packet includes second time synchronization information, and the second time synchronization information is generated by the serving gateway; obtaining, by the first base station, the second time synchronization information based on the data packet; and performing, by the first base station, data transmission at a time indicated by the second time synchronization information and at the resource location of the radio resource. In this implementation, the manner in which the second time synchronization information is obtained by the first base station and the data is transmitted by using the second time synchronization information in 1A architecture are described, adding an applicable scenario to the embodiment of this application.

In a possible design, when a transmitted data packet can be directly transmitted from an MBMS gateway to the second base station, the method further includes: receiving, by the first base station, a data packet from the MBMS gateway, where a header of the data packet includes second time synchronization information, and the second time synchronization information is generated by the MBMS gateway; obtaining, by the first base station, the second time synchronization information based on the data packet; and performing, by the first base station, data transmission at a time indicated by the second time synchronization information and at the resource location of the radio resource. In this implementation, the manner in which the second time synchronization information is obtained by the second base station and the data is transmitted by using the second time synchronization information in MBMS architecture are described, adding an applicable scenario to the embodiments of this application.

In a possible design, when the first base station and the second base station do not support direct transmission of signaling and data, and when the first base station and the second base station belong to the same core network, the sending, by the first base station, a first message to the second base station includes: sending, by the first base station, the first message to the core network, where the first message further carries identification information of the second base station, and the first message is further used to instruct the core network to send the first message to the second base station. In this implementation, transmission manners of the first base station and the second base station are provided when the first base station and the second base station cannot directly transmit signaling and data, adding an implementation scenario to the embodiment of this application.

In a possible design, when the first base station and the second base station do not support direct transmission of signaling and data, and when the first base station belongs to a source core network and the second base station belongs to a target core network, the sending, by the first base station, a first message to the second base station includes: sending, by the first base station, the first message to the source core network, where the first message further carries identification information of the second base station, and the first message is further used to instruct the source core network to send the first message to the target core network and then to the second base station. In this implementation, transmission manner of the first base station and the second base station is provided when the first base station and the second base station cannot directly transmit signaling and data and when the first base station and the second base station do not belong to the same core network, adding an implementation scenario to the embodiment of this application.

In a possible design, the resource scheduling information includes a resource block RB sequence number or an RB location, a resource scheduling period and a modulation and coding scheme MCS. In this implementation, the content included in the resource scheduling information is specified, so that the embodiment of this application is more operable.

A third aspect of the embodiments of this application provides a base station. The base station is a second base station, including a first transceiver unit and a processing unit. The first transceiver unit is configured to receive a first message from a first base station, where the first message is used to request the base station to allocate a radio resource for a specific bearer, and the first message includes resource scheduling information; the processing unit is configured to determine, based on the resource scheduling information, a resource location of the radio resource and schedule the radio resource; and the first transceiver unit is further configured to send a first response message in response to the first message to the first base station. In the embodiment of this application, on the basis of multi-connectivity data transmission, a first receiving unit receives the first message of the first base station to establish a transmission resource with the terminal and obtains the resource scheduling information preset by a first terminal through the first message, and then determines to allocate a radio resource to the terminal, to implement multi-cell coordinated downlink transmission, thereby improving transmission efficiency of terminal data.

In a possible design, the first transceiver unit is further configured to receive first time synchronization information from the first base station; or the first transceiver unit is further configured to send the first time synchronization information to the first base station, where the first time synchronization information is used to indicate a time at which signaling transmission is started and the first time synchronization information includes a subframe index or a timestamp. In this implementation, the manner in which the first time synchronization information is shared by the first base station and the second base station is described, adding a realizable implementation to the embodiment of this application.

In a possible design, the base station further includes a second transceiver unit: the second transceiver unit is configured to send a second message to a terminal, where the second message includes radio resource configuration information determined by the second base station for the terminal; and the second transceiver unit is further configured to receive a second response message from the terminal in response to the second message, where the second response message is used to indicate that the terminal has completed radio resource configuration. In this implementation, the second base station sends the second message to the terminal and receives a response sent by the terminal, optimizing steps of the embodiment of this application.

In a possible design, the second transceiver unit is specifically configured to send the second message to the terminal at a time indicated by the first time synchronization information and at the resource location of the radio resource. In this implementation, how the second base station sends the second message to the terminal is specifically refined, increasing implementability of the embodiment of this application.

In a possible design, the first transceiver unit is specifically configured to receive the second response message sent by the first base station, where the second response message is sent by the terminal to the first base station; or after the receiving, by the second base station, a second response message from the terminal in response to the second message, the first transceiver unit is further specifically configured to send the second response message to the first base station. In this implementation, manners in which the second response message is received by the second base station are described, adding realizable implementations to the embodiment of this application.

In a possible design, when a transmitted data packet is routed from the first base station to the second base station and to the terminal, the first transceiver unit is further configured to receive the data packet from the first base station, where a header of the data packet includes second time synchronization information, the second time synchronization information is used to indicate a time at which the second base station starts data transmission, and the second time synchronization information includes a subframe index or a timestamp; the processing unit is further configured to obtain the second time synchronization information based on the data packet; and the second transceiver unit is further configured to perform data transmission at a time indicated by the second time synchronization information and at a resource location of the radio resource. In this implementation, the manners in which the second time synchronization information is obtained by the second base station and the data is transmitted by using the second time synchronization information in 3C architecture are described, improving steps of the embodiment of this application.

In a possible design, when a transmitted data packet is directly transmitted from a serving gateway to the second base station, the base station further includes a third transceiver unit. The third transceiver unit is configured to receive a data packet from the serving gateway, where a header of the data packet includes second time synchronization information, and the second time synchronization information is generated by the serving gateway; the processing unit is further configured to obtain the second time synchronization information based on the data packet; and the second transceiver unit is further configured to perform data transmission at a time indicated by the second time synchronization information and at the resource location of the radio resource. In this implementation, the manners in which the second time synchronization information is obtained by the second base station and the data is transmitted by using the second time synchronization information in 1A architecture are described, adding an applicable scenario to the embodiment of this application.

In a possible design, when a transmitted data packet is directly transmitted from an MBMS gateway to the second base station, the base station further includes a fourth transceiver unit. The fourth transceiver unit is configured to receive a data packet from the MBMS serving gateway, where a header of the data packet includes second time synchronization information, and the second time synchronization information is generated by the MBMS gateway; the processing unit is further configured to obtain the second time synchronization information based on the data packet; and the second transceiver unit is further configured to perform data transmission at a time indicated by the second time synchronization information and at the resource location of the radio resource. In this implementation, the manners in which the second time synchronization information is obtained by the second base station and the data is transmitted by using the second time synchronization information in MBMS architecture are described, adding an applicable scenario to the embodiment of this application.

In a possible design, the resource scheduling information carries a resource block (RB) sequence number or an RB location, a resource scheduling period and a modulation and coding scheme (MCS). In this implementation, the content included in the resource scheduling information is specified, so that the embodiment of this application is more operable.

In a possible design, when the first base station and the second base station belong to a same core network, the third transceiver unit is specifically configured to receive the first message sent by the core network, where the first message further includes identification information of the second base station, and the first message is sent by the first base station to the core network. In this implementation, transmission manner of the first base station and the second base station is provided when the first base station and the second base station cannot directly transmit signaling and data, adding an implementation scenario to the embodiment of this application.

In a possible design, when the first base station belongs to a source core network and the second base station belongs to a target core network, and the third transceiver unit is specifically configured to receive the first message sent by the target core network, where the first message further includes identification information of the second base station, and the first message is sent by the first base station to the source core network and then to the target core network. In this implementation, transmission manner of the first base station and the second base station is provided when the first base station and the second base station cannot directly transmit signaling and data and when the first base station and the second base station do not belong to the same core network, adding an implementation scenario to the embodiment of this application.

A fourth aspect of the embodiments of this application provides a base station. The base station is a first base station, including a first transceiver unit. The first transceiver unit is configured to send a first message to a second base station, where the first message is used to request the second base station to allocate a radio resource for a specific bearer, the first message includes resource scheduling information, and the resource scheduling information is used to indicate a resource location of the radio resource for the second base station; and the first transceiver unit is further configured to receive a first response message from the second base station in response to the first message, where the first response message is used to acknowledge that the radio resource has been allocated. In the embodiment of this application, on the basis of multi-connectivity data transmission, the first transceiver unit sends the first message to the second base station to establish transmission resource with the terminal, so that the second base station obtains the resource scheduling information preset by a first terminal through the first message, and then the first transceiver unit receives the first response message to determine that the second base station allocates a radio resource to the terminal, to implement multi-cell coordinated downlink transmission, thereby improving transmission efficiency of terminal data.

In a possible design, the first transceiver unit is further configured to receive first time synchronization information from the second base station, or the first transceiver unit is further configured to send the first time synchronization information to the second base station, where the first time synchronization information is used to indicate a time at which signaling transmission is started and the first time synchronization information includes a subframe index or a timestamp. In this implementation, the manner in which the first time synchronization information is shared by the first base station and the second base station is described, adding a realizable implementation to the embodiment of this application.

In a possible design, the base station further includes a second transceiver unit. The second transceiver unit is configured to send a second message to a terminal, where the second message includes radio resource configuration information determined by the second base station for the terminal; and the second transceiver unit is further configured to receive a second response message from the terminal in response to the second message, where the second response message is used to indicate that the terminal has completed radio resource configuration. In this implementation, the first base station sends the second message to the terminal and receives a response sent by the terminal, optimizing steps of the embodiment of this application.

In a possible design, the second transceiver unit is specifically configured to send the second message to the terminal at a time indicated by the first time synchronization information and at the resource location of the radio resource. In this implementation, how the first base station sends the second message to the terminal is specifically refined, increasing implementability of the embodiment of this application.

In a possible design, the first transceiver unit is specifically configured to receive the second response message sent by the second base station, where the second response message is sent by the terminal to the second base station; or after the receiving, by the first base station, a second response message from the terminal in response to the second message, the first transceiver unit is further specifically configured to send the second response message to the second base station. In this implementation, the manners in which the second response message is received by the first base station are described, adding realizable implementations to the embodiment of this application.

In a possible design, when a transmitted data packet is routed from the first base station to the second base station and to the terminal, the first transceiver unit is further configured to send the data packet to the second base station, where a header of the data packet includes second time synchronization information, the second time synchronization information is used to indicate a time at which the second base station starts data transmission, and the second time synchronization information includes a subframe index or a timestamp; and the second transceiver unit is further configured to perform data transmission at a time indicated by the second time synchronization information and at the resource location of the radio resource. In this implementation, the manner in which the second time synchronization information is obtained by the first base station and the data is transmitted by using the second time synchronization information in 3C architecture are described, improving steps of the embodiment of this application.

In a possible design, when a transmitted data packet is directly transmitted from a serving gateway to the second base station, the base station further includes a third transceiver unit and a first processing unit. The third transceiver unit is configured to receive a data packet from the serving gateway, where a header of the data packet includes second time synchronization information, and the second time synchronization information is generated by the serving gateway; the first processing unit is further configured to obtain the second time synchronization information based on the data packet; and the second transceiver unit is further configured to perform data transmission at a time indicated by the second time synchronization information and at the resource location of the radio resource. In this implementation, the manners in which the second time synchronization information is obtained by the first base station and the data is transmitted by using the second time synchronization information in 1A architecture are described, adding a realizable scenario to the embodiments of this application.

In a possible design, when a transmitted data packet is directly transmitted from an MBMS gateway to the second base station, the base station further includes a fourth transceiver unit and a second processing unit. The fourth transceiver unit is configured to receive a data packet from the MBMS gateway, where a header of the data packet includes second time synchronization information, and the second time synchronization information is generated by the MBMS gateway; the second processing unit is configured to obtain the second time synchronization information based on the data packet; and the second transceiver unit is further configured to perform data transmission at a time indicated by the second time synchronization information and at the resource location of the radio resource. In this implementation, the manners in which the second time synchronization information is obtained by the second base station and the data is transmitted by using the second time synchronization information in MBMS architecture are described, adding applicable scenarios to the embodiments of this application.

In a possible design, when the first base station and the second base station do not support direct transmission of signaling and data, and when the first base station and the second base station belong to a same core network, the third transceiver unit is specifically configured to send the first message to the core network, where the first message further carries identification information of the second base station, and the first message is further used to instruct the core network to send the first message to the second base station. In this implementation, transmission manner of the first base station and the second base station is provided when the first base station and the second base station cannot directly transmit signaling and data, adding an implementation scenario to the embodiment of this application.

In a possible design, when the first base station and the second base station do not support direct transmission of signaling and data, and when the first base station belongs to a source core network and the second base station belongs to a target core network, the third transceiver unit is specifically configured to send first message to the source core network, where the first message further carries identification information of the second base station, and the first message is further used to instruct the source core network to send the first message to the target core network and then to the second base station. In this implementation, transmission manner of the first base station and the second base station is provided when the first base station and the second base station cannot directly transmit signaling and data and when the first base station and the second base station do not belong to a same core network, adding an implementation scenario to the embodiment of this application.

In a possible design, the resource scheduling information includes a resource block RB sequence number or an RB location, a resource scheduling period and a modulation and coding scheme MCS. In this implementation, the content included in the resource scheduling information is specified, so that the embodiment of this application is more operable.

A fifth aspect of the embodiments of this application further provides a computer readable storage medium. The computer readable storage medium includes an instruction, and when run on a computer, the instruction enables the computer to perform the methods according to the foregoing aspects.

A sixth aspect of the embodiments of this application provides a computer program product including an instruction, and when the computer program product is run on a computer, the computer is caused to perform the methods according to the foregoing aspects.

From the foregoing technical solution, the embodiments of this application include the following advantages: receiving, by a second base station, a first message from a first base station, where the first message is used to request the second base station to allocate a radio resource for a specific bearer, and the first message includes resource scheduling information; determining, by the second base station, based on the resource scheduling information, a resource location of the radio resource and scheduling the radio resource; and sending, by the second base station, a first response message in response to the first message to the first base station. In the embodiments of this application, on the basis of multi-connectivity data transmission, the second base station receives the first message of the first base station to establish transmission resource with the terminal and obtains the resource scheduling information preset by a first terminal through the first message, and then determines to allocate a radio resource to the terminal, to implement multi-cell coordinated downlink transmission, thereby improving transmission efficiency of terminal data.

DESCRIPTION OF EMBODIMENTS

Figure 1:
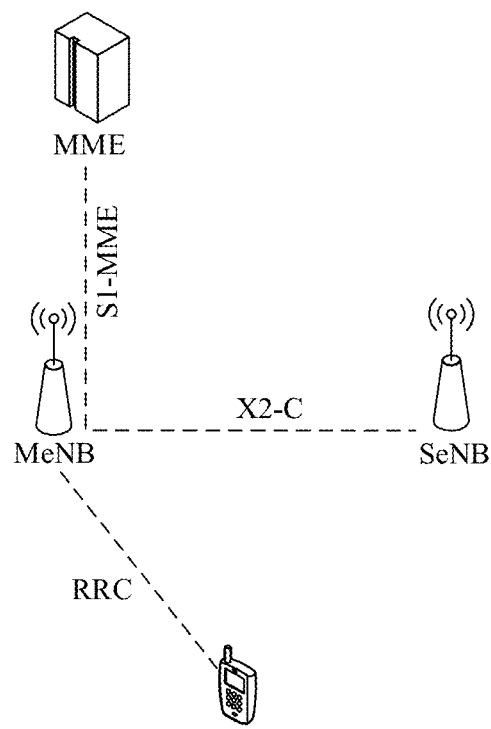
FIG. 1 is an architectural topology diagram of a possible dual-connectivity control plane according to an embodiment of this application.

This application provides a data transmission method and device, configured to improve transmission efficiency of terminal data.

In the specification, claims, and accompanying drawings of this application, the terms "first", "second", "third", "fourth", and the like (if any) are intended to distinguish between similar objects but do not necessarily indicate a specific order or sequence. It should be understood that the data termed in such a way are interchangeable in proper circumstances, so that the embodiments of the present invention described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those steps or units, but may include other steps or units not clearly listed or inherent to such a process, method, system, product, or device.

The term "a plurality of" in the embodiments of this application means two or more than two.

The embodiments of this application are based on multi-connectivity coordinated data transmission, that is, a terminal can be connected to a plurality of base stations at the same time. The plurality of base stations transmit same data to the terminal to provide multi-connectivity coordinated data transmission service. Among the plurality of base stations, a base station which is connected to a core network through S1-MME connection is a primary base station, and at least one of the other base stations is a coordinated base station. In the embodiments of this application, for convenience of description, the primary base station in multi-connectivity coordinated data transmission is referred to as a first base station, a coordinated base station in multi-connectivity coordinated data transmission is referred to as a second base station, so that a quantity of second base stations may be one or more than one. It should be noted that, the embodiments of this application can use a procedure similar to the prior art to support multi-connectivity coordinated data transmission, such as dual connectivity (DC) technology. It may be understood that, in different technologies, names of corresponding base stations are different. For example, in the dual connectivity technology, the first base station is similar to the primary base station, the second base station is similar to the secondary base station; and in a macro-micro network, the first base station is similar to a macro base station and the second base station is similar to a small base station. This is not limited herein.

For convenience of understanding, the embodiments of this application are described by using dual connectivity as an example.

The dual connectivity technology is a data splitting and convergence technology under the premise of non-ideal backhaul, which means that one terminal can be connected to two base stations at the same time for data transmission. A typical scenario is that one base station is the primary base station and at least one of the other base stations is the secondary base station. The primary base station and the coordinated base station respectively manage radio resources in respective base stations. A standard of the primary base station may be the same as or different from that of the secondary base station. For example, the primary base station and the secondary base station are both long term evolution (long term evolution, LTE) base stations, that is, evolved NodeBs (evolved NodeB, eNode/eNB). The primary base station may be referred to as MeNB (master eNB) and the secondary base station may be referred to as SeNB (secondary eNB), and dual connectivity in the scenario may be referred to as LTE DC.

FIG. 1 is an architectural topology diagram of a possible dual-connectivity control plane according to an embodiment of this application. MeNB represents a primary base station, SeNB represents a secondary base station, and MME (Mobility Management Entity) is a mobile control entity of the core network. The MeNB and the SeNB can be connected through an X2 interface to directly transmit signaling and data. The characteristic of the control plane architecture is that there is no direct signaling connection between the SeNB and the core network, and the MeNB must be used to perform signaling dialogue with the core network.

It should be noted that, the embodiments of this application is not only applicable to an LTE scenario, but also applicable to a 5G NR (new radio) scenario, that is, at least one base station of the primary base station or the secondary base station is the NR base station. For example, the primary base station is an LTE base station and the secondary base station is an NR base station, the primary base station is represented as MeNB, and the secondary base station is represented as SgNB; or the primary base station and the secondary base station are both NR base stations, the primary base station is represented as MgNB, and the secondary base station is represented as SgNB; or the primary base station is an NR base station and the secondary base station is an LTE base station, the primary base station is represented as MgNB and the secondary base station is represented as SeNB. In the 5G NR scenario, the primary base station and the secondary base station can directly transmit signaling and data through an Xn interface. For example, when the primary base station is an NR base station, the primary base station and the secondary base station can directly transmit signaling and data through an Xn interface; and when the secondary base station is an NR base station and the primary base station is an LTE base station, the primary base station and the secondary base station can directly transmit signaling and data through an X2 interface. In addition, in the 5G NR scenario, the core network device may be represented as new crop or other names. This is not limited herein.

Figure 2:
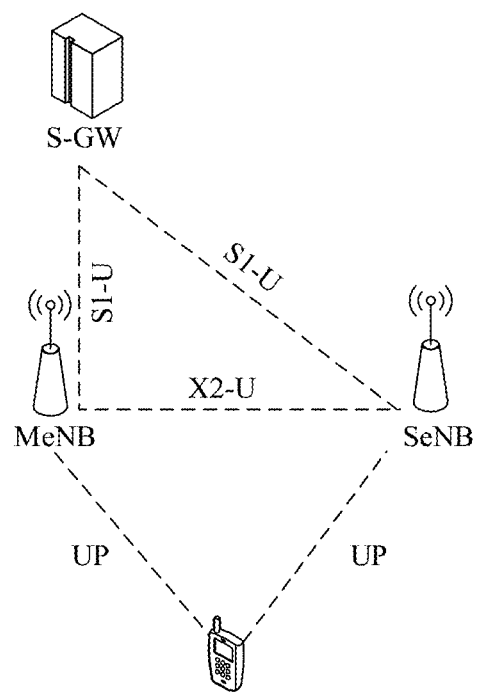
FIG. 2 is an architectural topology diagram of a possible dual-connectivity user plane according to an embodiment of this application.

FIG. 2 is an architectural topology diagram of a possible dual-connectivity user plane according to an embodiment of this application. There are three types of data transmission manners for downlink data on a user plane. The first type is referred to as a master cell group bearer, that is, an MCG (master cell group) bearer, and an IP data packet from a serving gateway (SGW) is directly sent to a terminal through an MeNB. The second type is referred to as a secondary cell group bearer, that is, an SCG (secondary cell group) bearer, and an IP data packet from an SGW is directly sent to the terminal through an SeNB. The third type is referred to as a split bearer, and some of IP data packets are shunted from the MeNB to the SeNB, and then sent by the SeNB to the terminal. System architecture for configuring the SCG bearer on the SeNB may be referred to as 1A architecture, and system architecture for configuring the split bearer may be referred to as 3C architecture.

Figure 3:
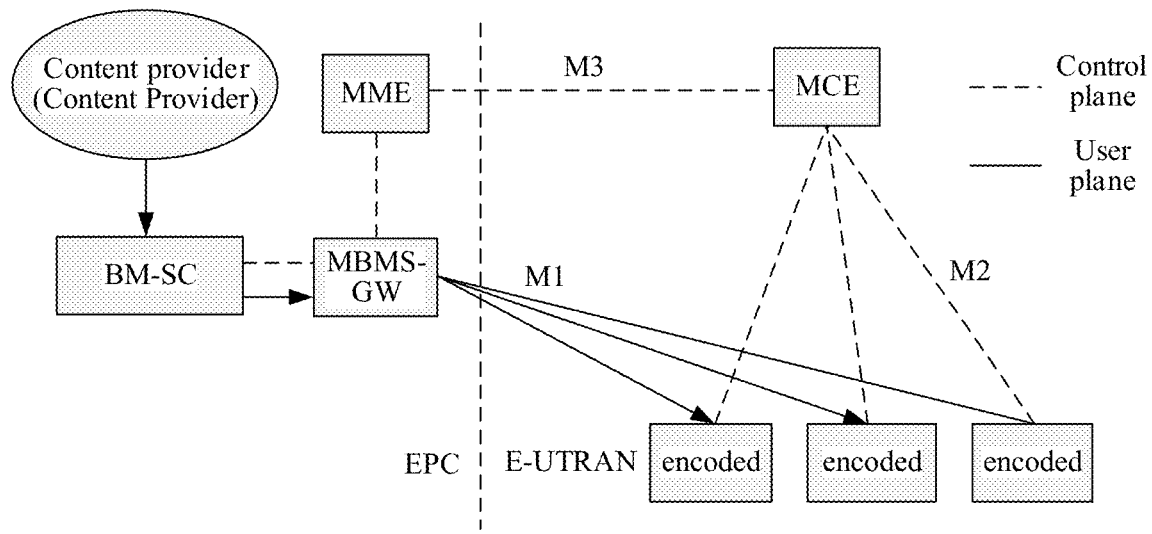
FIG. 3 is an architectural topology diagram of a possible MBSFN according to an embodiment of this application.

FIG. 3 is an architectural diagram of a multicast-broadcast single-frequency network (multimedia broadcast single frequency network or multicast broadcast single frequency network, MBSFN) according to an embodiment of this application. A broadcast/multicast service center (BM-SC) is responsible for performing authentication, charging and traffic shaping on a content provider and is responsible for a SYNC protocol to synchronously transmit data between eNodeBs. A multimedia broadcast multicast service gateway (MBMS-GW) is a logical node responsible for multicasting an IP packet from the BM-SC to all eNodeBs included in an MBSFN area. The BM-SC processes session control signaling via an MME. An M1 interface is configured for communications between the MBMS-GW and the eNodeB. The interface is configured for data transmission on a user plane. An M2 interface is configured for communications between a multi-cell entity (Multi-cell/multicast Coordination Entity, MCE) and the eNodeB, and is configured to transmit information related to radio resource configuration and session control signaling. An M3 interface is configured for communications between the MME and the MCE. This interface is used to transmit E-RAB level session control signaling, such as start and stop an MBMS session.

Figure 4:
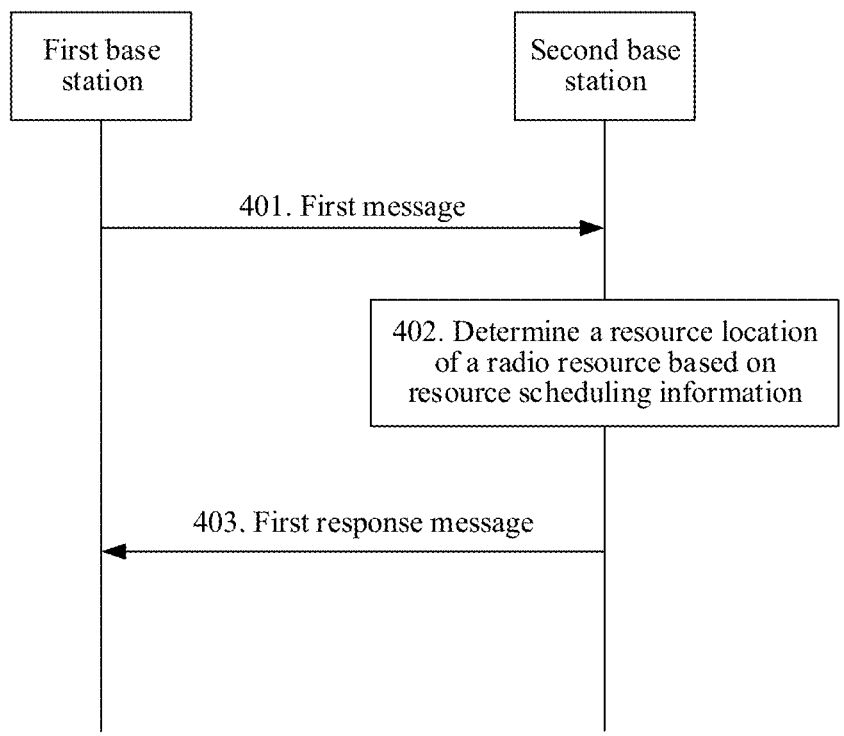
FIG. 4 is a schematic communication diagram of a possible data transmission method according to an embodiment of this application.

On the basis of the foregoing architecture, referring to FIG. 4, an embodiment of a data transmission method provided in an embodiment of this application includes the following steps.

401. A first base station sends a first message to a second base station.

To provide a coordinated data transmission service to a terminal so that a plurality of base stations send same data to the terminal, the first base station sends the first message to the second base station. The first message is used to request the second base station to allocate a radio resource for a specific bearer. In actual application, the first message may be a coordinated base station addition request message, or may be another existing message or a new message. This is not limited in this application. The specific bearer may be understood as a terminal bearer. The first message includes resource scheduling information, used to indicate a resource location of a radio resource to the second base station. The resource scheduling information at least includes a resource block index (RB index) or an RB location.

Optionally, the resource scheduling information may further include a modulation and coding scheme (MCS). The MCS can improve reception reliability of a receive-end, it can be understood that if the first base station and the second base station use the same modulation and demodulation method, the reliability of receiving signaling and data is stronger, and no time difference exists. The MCS can be obtained through selection by the first base station according to a channel quality indicator (CQI) of channel state information (CSI) fed back by the terminal. The CQI usually has 1 to 15 values. Different values correspond to different MCSs, which is equal to selecting different code rates and modulation and coding modes. The CQI can be used to reflect channel quality. For example, if the channel quality is good, the modulation and coding mode with high efficiency, such as 64 quadrature amplitude modulation (QAM), is used to transmit more data. On the contrary, if the channel quality is bad, a basic binary phase shift keying (BPSK) may be used. It should be noted that the CQI may be set as a suitable modulation scheme (for example, quadrature phase shift keying (QPSK), 16QAM, 256QAM, or the like) or code rate (code rate) in a specific frequency band. This is not limited herein.

Optionally, the first message may further include a resource scheduling period configured by the first base station. In actual application, the resource scheduling period may be an optional parameter. If the first base station does not notify the second base station of the resource scheduling period, the first base station needs to notify the second base station of the time at which the first base station schedules resources before scheduling the resources.

Optionally, the first message may further include a key required in an existing dual connectivity process, a terminal security capability, bearer information, tunnel information, quality of service (QoS) information, and the like. Details are not described in this application again.

Optionally, the resource scheduling information, the MCS and the resource scheduling period may be periodically updated, or may be updated according to other manners. This is not limited in the embodiments of this application.

402. The second base station determines a resource location of a radio resource based on resource scheduling information.

After the second base station receives the first message sent by the first base station, the resource scheduling information included in the first message is obtained. Because the resource scheduling information includes an RB index or an RB location, the second base station determines the resource location of the radio resource required to be scheduled from the content of the resource scheduling information.

Optionally, the second base station can further obtain the MCS through the received first message to use the same modulation and demodulation manner used by the first base station. Optionally, if the first message further includes the resource scheduling period configured by the first base station, the second base station can determine the time at which the first base station schedules resources each time through the resource scheduling period. If the first base station does not notify the second base station of the resource scheduling period, the second base station can receive a notification message sent by the first base station before the first base station schedules resources. The notification message is used to indicate the time at which the first base station schedules the resources.

403. The second base station sends a first response message to the first base station.

After the second base station receives the first message sent by the first base station, to notify the first base station that the second base station determines to allocate the radio resource, the first response message in response to the first message is sent to the first base station. In actual application, the first response message may be an addition request acknowledgement message of coordinated base station, or can be another existing message or a new message. This is not limited in this application. The first response message may include the radio resource configuration information allocated by the second base station to a specific bearer. The radio resource configuration information may include a configuration parameter for example, bearer information or tunnel information, of an entity such as a physical layer (PHY)/media access control (, MAC) layer/radio link control (RLC) layer/packet data convergence protocol (PDCP). This is not specifically limited herein. Optionally, in actual application, the radio resource configuration information may further be directly sent by the second base station to the first base station, that is, not included in the first response message, so a manner of sending the radio resource configuration information is not specifically limited herein.

Optionally, the first response message may further include a response whether the coordinated base station can perform coordinated transmission.

After the first base station and the second base station share the radio resource configuration information, the radio resource configuration information is synchronously sent to the terminal. To ensure that the radio resource configuration information can be synchronously sent, the first base station and the second base station can share the same first time synchronization information, and at the time indicated by the first time synchronization information, the radio resource configuration information is synchronously sent at a resource location of the downlink radio resource to the terminal. It should be understood that, after receiving the radio resource configuration information, the terminal triggers a random access process with the second base station to access to the second base station, and sends a response message to the first base station and the second base station. The response message is used to indicate that the terminal has completed radio resource configuration.

Optionally, in this embodiment, the first base station and the second base station can implement direct transmission of signaling and data between the base stations through an X2 interface. However, in an actual application scenario, no X2 interface may exist between the first base station and the second base station. In this scenario, signaling and data both need to be forwarded through an S1 interface. For example, the message sent by the first base station to the second base station needs to be first sent to a core network through the S1 interface, and then the message is forwarded to the second base station by the core network through an S1 interface with the second base station. Optionally, if in a 5G NR system, the S1 interface also needs to be replaced with an NG interface or another interface. This is not limited in this application. In addition, when data and signaling between the first base station and the second base station need to be forwarded through the core network, to enable the core network to determine the second base station required to be forwarded, a message required by the first base station to be forwarded by the core network to the second base station further needs to carry identification information of the second base station, such as at least one of a cell identifier (cell ID), an eNB ID (eNB ID), a cell global identity (CGI), a physical cell identity (PCI), or the like. This is not specifically limited in herein. The message needs to be forwarded by the core network to the second base station may be an existing S1 interface message, or may be a new message. This is not limited in this application. Above all, in a scenario in which the X2 interface exists, the first base station and the second base station perform direct transmission of signaling and data. In this scenario, signaling and data are both required to be forwarded by the core network.

In addition, in actual application, there is another case in which the first base station and the second base station cannot directly transmit signaling and data, and do not belong to the same core network. For convenience of distinction, the core network to which the first base station belongs is referred to as a source core network, and the core network to which the second base station belongs is referred to as the target core network. When the first base station and the second base station need to perform signaling or data transmission, the signaling or data is forwarded through the source core network and the target core network. For example, that the first base station sends a message to the second base station may include: the first base station sends the message to the source core network through an S1 interface, where the message further carries the identification information of the second base station. The source core network determines the target core network through the identification information of the second base station, and sends the message to the target core network, so that the target core network forwards the message to the second base station. Likewise, signaling or data sent by the second base station sends to the first base station also needs to be forwarded by the target core network and the source core network. Details are not described herein again.

In the embodiments of this application, on the basis of multi-connectivity data transmission, the second base station receives the first message of the first base station to establish a transmission resource with the terminal and obtains the resource scheduling information preset by a first terminal through the first message, and then determines to allocate a radio resource to the terminal, to implement multi-cell coordinated downlink transmission, thereby improving transmission efficiency of terminal data. In addition, the embodiments of this application also adds a scenario about how to perform synchronous transmission of control plane signaling and user plane data when there is no X2 interface between the first base station and the second base station, and a scenario about how to perform synchronous transmission of control plane signaling and user plane data when the first base station and the second base station do not have the X2 interface and do not belong to a same core network. The embodiment of this application is applicable to a plurality of application scenarios.

Figure 5:
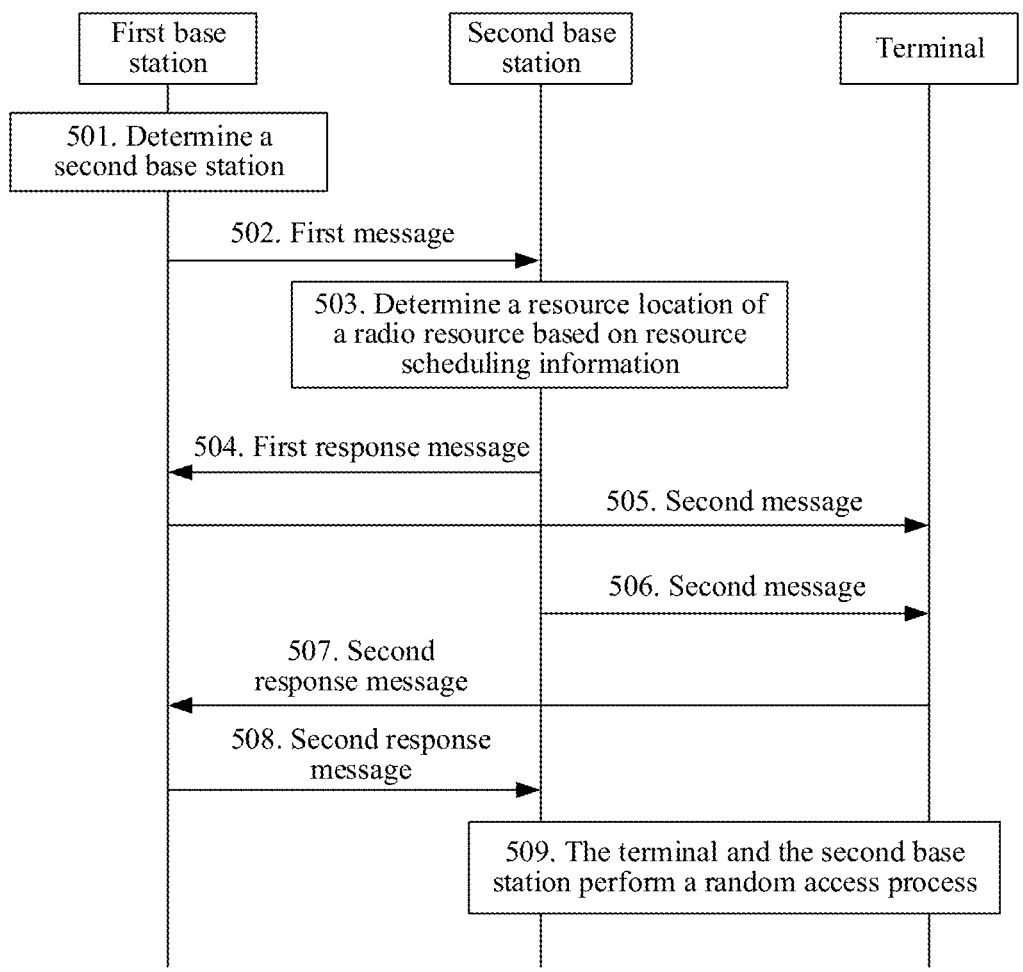
FIG. 5 is a schematic communication diagram of another possible data transmission method according to an embodiment of this application.

FIG. 5 is another embodiment of a data transmission method provided by an embodiment of this application on the basis of FIG. 4. The method includes the following steps.

501. A first base station determines a second base station.

The first base station is a base station serving a terminal, and the terminal receives an interference signal from a neighboring cell. The first base station determines the second base station from one or more interfered base stations detected by the terminal according to a measurement report reported by the terminal, so that the first base station and the second base station provide a coordinated data transmission service for the terminal. The measurement report includes information of the base stations detected by the terminal, so that service base stations of the terminal include one first base station and at least one second base station. The first base station and the at least one second base station form a logical cell group. It may be understood that, in actual application, a measurement report reported by the terminal can be constantly updated. The second base station determined by the first base station through the measurement report is correspondingly updated, realizing dynamic construction of the logical cell group.

The terminal in the embodiments of this application may be a drone terminal, an Internet of Things (IoT) device or a wearable device, for example, a smartwatch and a sports bracelet, or a communications terminal, a terminal having access to the Internet, for example, a personal digital assistant (PDA), a mobile internet device (MID), a tablet computer, a mobile phone, or the like. This is not limited herein.

Using an example in which the terminal is a drone terminal, when a height of the drone terminal in the air is much higher than a height of a base station antenna, the drone terminal can detect more cells in the air due to no obstruction of line-of-sight propagation, and the uplink signal from the drone terminal interferes the ground terminal such as a smartphone and an Internet of Things device. Moreover, as the height of the drone terminal rises, interference of signal to interference plus noise ratio (SINR) is constantly increased. In addition, under the air coverage, the downlink interference is too large, and radio link failure (RLF) is prone to happen, causing frame freezing when the drone terminal performs service transmission in the air. Therefore, the interference problem caused by the drone terminal under the air coverage scenario needs to be resolved. In the embodiment of this application, when entering into an air flight mode, the drone terminal performs measurement according to measurement configuration of the first base station and reports the measurement report to the first base station. The measurement report may include one or more of reference signal received quality (RSRQ), received signal strength indicator (RSSI) or reference signal received power (RSRP). After receiving the measurement report, according to a descendant order of signal strength, the first base station selects a preset quantity of base stations from the base stations detected by the drone terminal as second base stations, or the first base station determines base stations whose signal strength in the detected base stations differs from the signal strength of the first base station by less than the first preset value as second base stations. Therefore, a manner in which the first base station determines the second base station is not limited herein.

In addition, when the terminal is a drone terminal, in actual application, there are many ways to determine whether the drone terminal enters into an air flight mode. For example, if a quantity of detected base stations in the measurement report is greater than a second preset value, the first base station determines that the drone terminal enters into the air flight mode. Alternatively, if a flight height of the drone terminal is greater than a third preset value, the first base station determines that the drone terminal enters into the air flight mode. Moreover, the drone terminal sends indication information to the first base station, the indication information is used to indicate to the first base station that the drone terminal enters into an air flight mode. Therefore, the manner of determining whether the drone terminal enters into an air flight mode is not limited herein.

502. The first base station sends a first message to the second base station.

503. The second base station determines a resource location of a radio resource based on resource scheduling information.

504. The second base station sends a first response message to the first base station.

In this application, step 502 to step 504 are similar to step 401 to step 403 in FIG. 4, and details are not described herein again.

505. The first base station sends a second message to a terminal.

After the first base station receives the first response message sent by the second base station, radio resource configuration information configured by the second base station for the terminal is obtained. The first base station forwards the radio resource configuration information configured by the second base station to the terminal through the second message. Optionally, before the first base station forwards the radio resource configuration information to the terminal, it can be determined whether the radio resource configuration information is reasonable, and if the radio resource configuration information is reasonable, the first base station forwards the information through the first message, otherwise the first base station does not forward the information.

506. The second base station sends the second message to the terminal.

In an actual application, the second message may be a radio resource control (RRC) connection reconfiguration message, or may be another existing message or a new message. This is not limited in this application. When the second message is the RRC connection reconfiguration message, the second message can carry related information about bearer configuration, related information about handover and related information about measurement configuration. This is not described in detail again in this application. To improve the reliability of receiving the second message by the terminal, when the first base station sends the second message to the terminal, the second base station can directly send a message of a same type to the terminal through an air interface of the second base station. It may be understood as that the second base station sends the second message to the terminal. It needs to be noted that, in actual application, this step is an optional step.

To ensure synchronous transmission of the second message, there are at least two manners: 1. The first base station configures first time synchronization information. The first time synchronization information is included in the first message sent by the first base station to the second base station, and then sent to the second base station. The first time synchronization information may be a timestamp or a subframe index. The timestamp may be an absolute time (for example, directly indicate a time at which signaling transmission is started), or may be another relative time (for example, time offset), or the first base station notifies the second base station of the subframe index that is desired to start scheduling at the same time; 2. The second base station configures the first synchronization information. The first time synchronization information is included in the first response message sent by the second base station to the first base station, and then sent to the first base station. It may be understood that, the first time synchronization information in the at least two manners are the same.

When the first base station and the second base station share the first time synchronization information, the first base station and the second base station send, by using the same MCS and resource scheduling period, the second message to the terminal at the time indicated by the first time synchronization information and at the resource location of the downlink radio resource, so that the second message can be sent to the terminal at the same time and in the same frequency. Optionally, when the first base station does not send the resource scheduling period to the second base station, the first base station notifies the second base station before scheduling the resource, so that the first base station and the second base station send the second message to the terminal at the same time and in the same frequency.

507. The terminal sends a second response message to the first base station.

After receiving the second message sent by the first base station, the terminal obtains the radio resource configuration information in the second message and sends the second response message in response to the second message to the first base station, to indicate the first base station that the terminal has completed radio resource configuration.

In actual application, the second response message may be an RRC connection reconfiguration complete message, or may be another existing message or a new message. This is not limited in this application.

508. The first base station sends the second response message to the second base station.

After receiving the second response message, the first base station notifies the second base station that the terminal has completed the radio resource configuration, and sends the second response message to the second base station.

Optionally, because the second base station sends the second message to the terminal through its air interface, the terminal also sends the second response message to the second base station, and then the second base station forwards the second response message to the first base station, so manners in which the first base station and the second base station receive the second response message are not limited herein. Therefore, it may be understood that there are multiple time sequences for the first base station and the second base station to receive the second response message, that is, the first base station may receive first, or the second base station may receive first, or both can simultaneously receive. This is not specifically limited herein.

509. The terminal and the second base station perform a random access process.

After obtaining the radio resource configuration information, the terminal triggers a random access process with the second base station. The random access process is used to establish a radio link between the terminal and the network. The terminal exchanges information with the second base station through random access, to complete subsequent operations such as call, resource request, data transmission and the like through random access, so that the terminal can implement uplink time synchronization with the second base station. It needs to be noted that the random access process between the terminal and the second base station is the prior art. Details are not described herein again.

In addition, in the embodiment of this application, the terminal can complete a random access process with the second base station through step 509 and can send the second response message through step 507. However, there is no sequence of steps between the two processes, that is, step 507 may be performed first, or step 509 may be performed first, or both are performed at the same time. This is not specifically limited herein.

It should be noted that, synchronous transmission of control plane signaling is achieved through step 502 to step 509. In actual application, a coordinated transmission process of a multi-connectivity data plane may further be included to achieve synchronous transmission of user plane data transmission. Similar to an LTE DC process, coordinated transmission process of the data plane may be based on a plurality of architectures. For convenience of understanding, architecture name in the prior art LTE DC is kept for use, such as 1A architecture or 3C architecture. Therefore, the name of the coordinated transmission process that can configure multi-connectivity data plane is not limited here. Because the embodiment of this application can be based on different architectures, steps performed in different architectures are different. For example, in the 1A architecture or the MBSFN architecture, during the transmission process of control plane signaling, in addition to performing the foregoing steps, the embodiment of the application needs to perform a path update process. While in the 3C architecture, the path update process may not be performed. Different architectures will be described in the following with reference to specific embodiments.

Figure 6A:
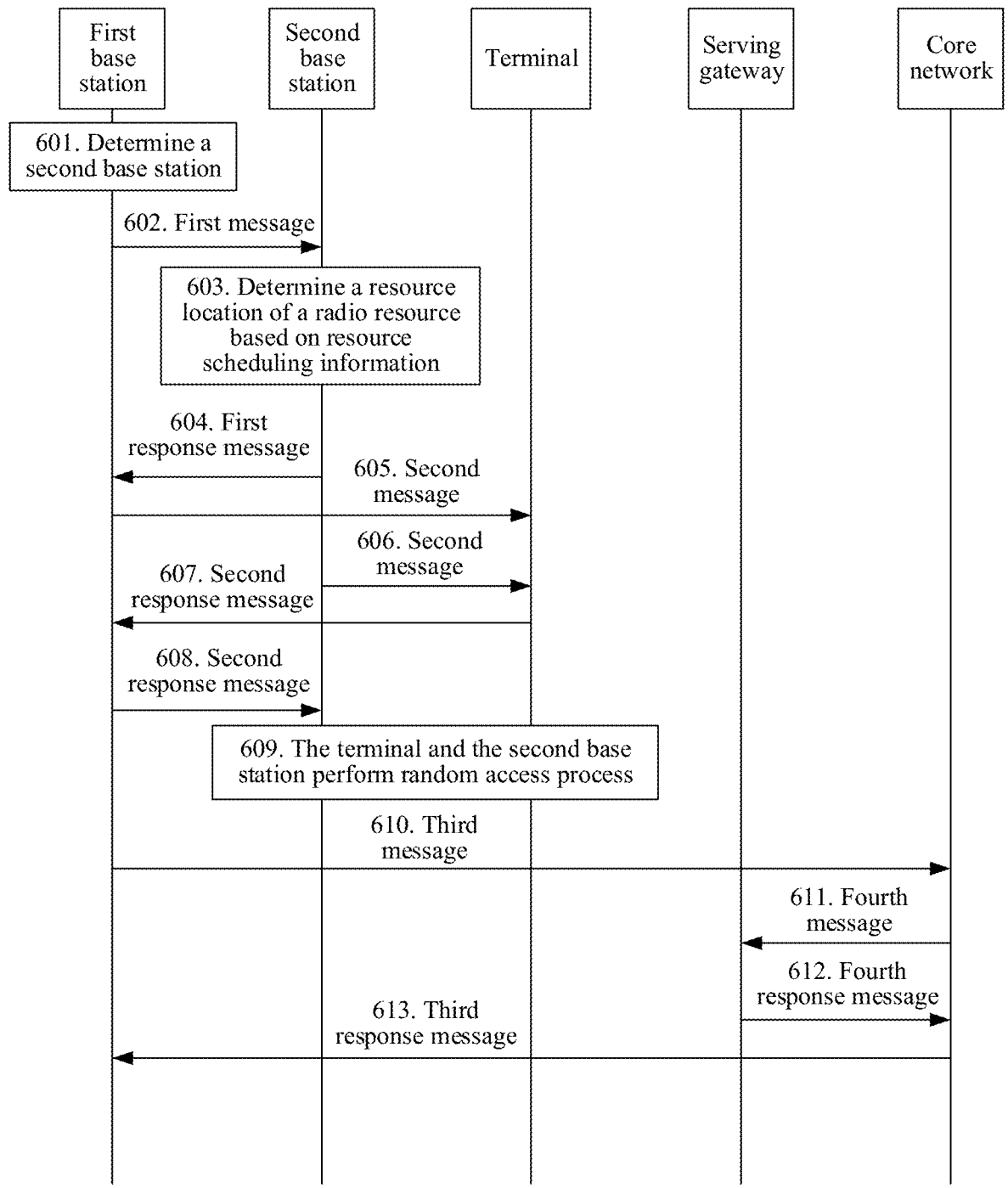
FIG. 6A is a schematic communication diagram of another possible data transmission method according to an embodiment of this application.

FIG. 6A is another embodiment of a data transmission method provided by the embodiment of this application on the basis of FIG. 5, and the data transmission of the user plane in this embodiment can be based on 1A architecture. The method specifically includes the following steps.

601. A first base station determines a second base station.

602. The first base station sends a first message to the second base station.

603. The second base station determines a resource location of a radio resource based on resource scheduling information.

604. The second base station sends a first response message to the first base station.

605. The first base station sends a second message to a terminal.

606. The second base station sends the second message to the terminal.

607. The terminal sends a second response message to the first base station.

608. The first base station sends the second response message to the second base station.

609. The terminal and the second base station perform a random access process.

In this application, step 601 to step 609 are similar to step 501 to step 509 shown in FIG. 5, and details are not described herein again.

610. The first base station sends a third message to a core network.

611. The core network sends a fourth message to a serving gateway.

612. The core network receives a fourth response message sent by the serving gateway.

613. The core network sends a third response message to the first base station.

The first base station sends the third message to the core network. The third message is used to notify the core network of an update of a bearer of the terminal. The third message may include a to-be-updated evolved radio access bearer (E-RAB) identifier and a data radio bearer (DRB) identifier between a base station and a corresponding terminal, QoS configuration information such as radio bearer QoS. In addition, the first base station modifies the locally stored QoS configuration information of the DRB bearer according to an indication of the third message. After receiving the third message, the core network sends the fourth message to the serving gateway. The fourth message is used to update the bearer and receives the fourth response message in response to the fourth message sent by the serving gateway. Then the core network sends the third response message in response to the third message to the first base station. The third response message is used to instruct the first base station to perform the modification and acknowledgement of the bearer. In the embodiment of this application, step 610 to step 613 are similar to the path update process in the existing LTE DC technology. Details are not described in this application again.

It should be noted that in the embodiment of this application and in the 1A architecture, during a process of changing the configuration of the bearer in step 611, the core network can configure indication information in the fourth message. The indication information is used to instruct the serving gateway to configure the second time synchronization message to determine a time for synchronous transmission of the user plane data packet.

It can be understood that interaction of control plane signaling can be implemented after the construction of the signaling bearer. In actual application, to send/receive data packets, a data bearer also needs to be established. In this application, the coordinated transmission process of the multi-connectivity data plane can also be implemented based on the 1A architecture, and specific steps may include the following steps.

Step 1. A serving gateway sends a data packet to a first base station and a second base station.

Figure 6B:
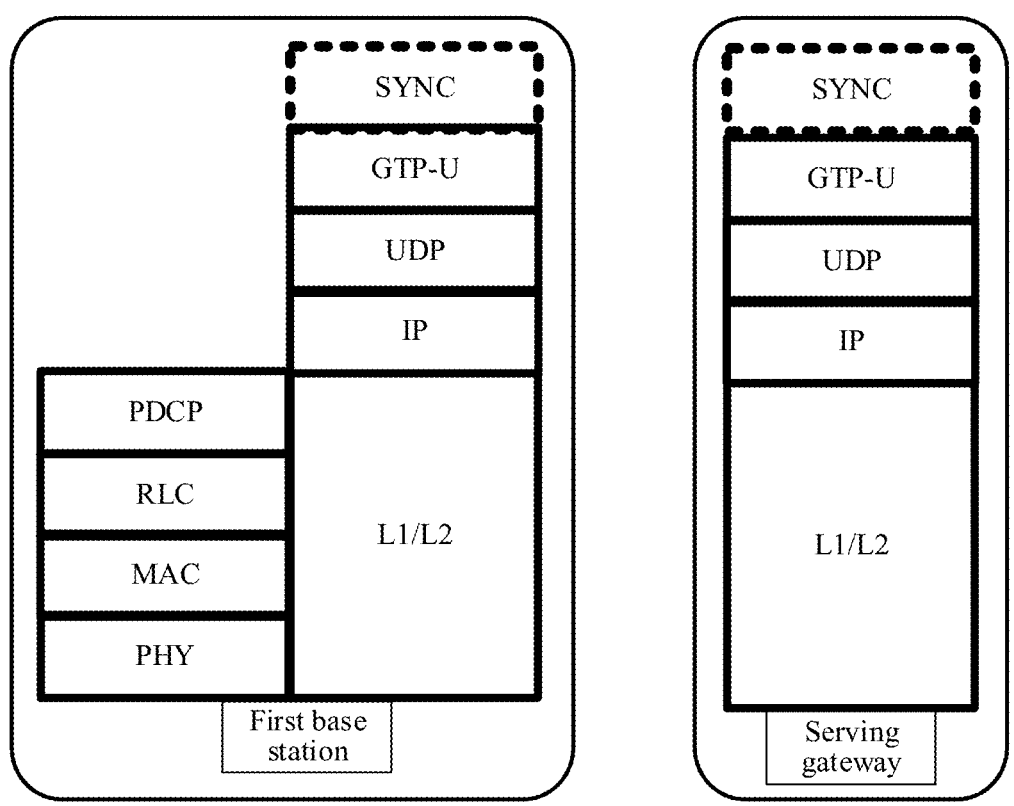
FIG. 6B is an architectural diagram of a possible protocol stack in 1A architecture according to an embodiment of this application.

When the data packet can be directly transmitted from the serving gateway to the second base station, and after the terminal is accessed to the second base station, to implement synchronous transmission of the user plane data, the serving gateway sends the data packet to the first base station and the second base station. A protocol layer header of the data packet includes second time synchronization information configured by the serving gateway. Similar to the first time synchronization information, the second time synchronization information may be a timestamp or a subframe index, and the second time synchronization information is used to indicate the time at which the data transmission is started. In actual application, there are multiple implementations in which the protocol layer header of the data packet includes the second time synchronization information. For example, FIG. 6B is a possible protocol stack architecture in the 1A architecture provided by an embodiment of this application. A new protocol layer, such as a synchronization (SYNC) layer can be added above an existing protocol layer such as a GPRS tunnelling protocol for the user plane (-U) layer on the serving gateway. The SYNC layer is used to indicate the second time synchronization information, that is, the serving gateway packages the to-be-transmitted data packet with a synchronization header (sync header). The sync header includes the second time synchronization information to be sent to the first base station and the second base station. It can be understood that, if the SYNC layer is added to a serving gateway side, the corresponding first base station and second base station can add a SYNC layer, which is used to parse the second time synchronization information in the SYNC layer. Optionally, the corresponding first base station and second base station may not add the SYNC layer, and directly use the existing protocol layer instead to parse the second time synchronization information in the SYNC layer. In addition, in the embodiment of this application, to distinguish the new protocol layer from the existing protocol layer, the new protocol layer is named as SYNC layer, which may be another name in actual application. This is not specifically limited in this application. Alternatively, a new protocol layer is not added to the serving gateway, the indication of the second time synchronization information is achieved on the existing protocol layer, for example, a GTP-U layer. That is, the second time synchronization information is added to a GTP-U data header, and after receiving the data packet, the corresponding first base station and second base station obtain the second time synchronization information by parsing the GTP-U header. Therefore, a manner of indicating the second time synchronization information is not limited herein.

It should be understood that, in the 1A architecture, before configuring the second time synchronization information, the serving gateway needs to be triggered to configure the information. There are multiple triggering manners. For example, before the first base station sends the first message to the second base station, the first base station instructs the serving gateway to trigger configuration of the second time synchronization information. The indication message may be an existing message between an existing first base station and the core network, or may be a new message. This is not limited in this application. Optionally, the indication message can also instruct the serving gateway to trigger the configuration of the second time synchronization information after the establishment of the dual connectivity procedure ends. The indication message may be an existing message between the existing first base station and the core network, or may be a new message. This is not limited in this application. Optionally, the indication message can also instruct the serving gateway to trigger the configuration of the second time synchronization information during changing the configuration of the bearer in the dual connectivity establishment process, for example, step 611 in this embodiment. This is not limited herein.

Step 2. The first base station obtains second time synchronization information.

After receiving the data packet sent by the serving gateway, the first base station parses the header of the data packet before the scheduling period to obtain the second time synchronization information. It should be noted that, if the data packet includes a newly-added synchronization header, the first base station can parse through a corresponding newly-added protocol layer, that is, the SYNC layer added above the original GTP-U layer. Optionally, the first base station can also obtain the second time synchronization information by direct parsing through the GTP-U layer. If the second time synchronization information is included in the header of the GTP-U data packet, the first base station obtains second time synchronization information by directly parsing through the GTP-U layer.

Step 3. The second base station obtains the second time synchronization information.

In the embodiment of this application, the manner in which the second base station obtains the second time synchronization information in step 3 is similar to the manner in which the first base station obtains the second time synchronization information in step 2. Details are not described herein again.

It needs to be noted that the first base station obtains the second time synchronization information through step 2, and the second base station obtains the second time synchronization information through step 3. There is no sequence of steps between the two processes, that is, step 2 may be performed first, or step 3 may be performed first, or both are performed at the same time. This is not limited herein.

Step 4. The first base station performs data transmission with a terminal.

Step 5. The second base station performs data transmission with the terminal.

When the first base station and the second base station share the second time synchronization information, both use the same MCS and resource scheduling period to transmit data with the terminal at the time indicated by the second time synchronization information and at the resource location of the downlink radio resource, so that same data can be sent at the same time and at the same frequency by the first base station and the second base station. Optionally, when the first base station does not send the resource scheduling period to the second base station, the first base station notifies the second base station before scheduling the resource each time, so that the first base station and the second base station send the same data to the terminal at the same time and at the same frequency.

In addition, if signaling is transmitted in the MBSFN architecture, a path update process similar to that in the 1A architecture also needs to be performed. Details are not described herein again. In addition, coordinated data transmission and user plane data transmission in the MBSFN architecture are directly established between the MBMS gateway and the second base station. A process of establishing the user plane is similar to a process of establishing the user plane in 1A. Referring to the MBSFN architecture shown in FIG. 3, the BM-SC configures the second time synchronization information. The BM-SC packages a synchronization header for the to-be-transmitted data and sends the data to the MBMS gateway. Then the MBMS gateway packages the data to an IP multicast packet and sends the data to the first base station and the second base station. After receiving the data packet, the first base station and the second base station parse the IP multicast packet to obtain the second time synchronization information. Subsequently, the steps of respectively performing data transmission by the first base station and the second base station with the terminal by using the second time synchronization information are similar to step 4 and step 5 in this embodiment. Details are not described herein again.

During the process of coordinated data transmission, if the resource scheduling information needs to be updated, that is, at least one of a resource scheduling location, an MCS, and a scheduling period needs to be updated, the first base station needs to reconfigure the resource scheduling information for the second base station. After updating, the first base station and the second base station restarts the coordinated data transmission process.

For data retransmission that may occur during data transmission, the first base station and the second base station may determine to retransmit according to whether the data fed back by the terminal is correctly received, thereby ensuring reliability of downlink data transmission. For the 1A architecture or the MBSFN architecture of the data plane transmission architecture, because the data is directly transmitted from the core network to the primary base station and the coordinated base station, there is no data plane interaction between the base stations. Therefore, repeated data packet may be directly retransmitted according to manners as follows:

The first base station receives feedback sent by the terminal. The feedback may be at least one of an acknowledgement (ACK) message, a negative acknowledgement (NACK) message or a discontinuous transmit (DTX) message. The DTX message is a scenario in which the terminal has neither fed back the ACK nor the NACK. When the feedback received by the first base station is the NACK or the DTX, the first base station directly retransmits the data packet to the terminal, until the maximum quantity of retransmission is reached.

In the embodiment of this application, a plurality of second base stations are controlled, by dynamically constructing the logical cell group, in a logical cell group by the first base station to transmit control plane signaling and user plane data, thereby turning neighboring interference signal into useful signals, and improving downlink throughput rate of the terminal. To ensure synchronous transmission between control plane signaling and the user plane data, enabling the first base station and the second base station to share the first time synchronization information used to synchronously transmit control plane signaling and the second time synchronization information used to synchronously transmit user plane data, there are multiple manners. For example, the first base station configures the first time synchronization information and sends the first time synchronization information to the second base station through the first message, or the second base station configures the first time synchronization information and sends the first time synchronization information to the first base station through the first response message. In addition, the synchronous transmission processes of the user plane data in the 1A architecture and the MBSFN architecture are described, adding realizable implementations and applicable scenarios to the embodiment of this application, thereby improving steps of the embodiment of this application.

Figure 7A:
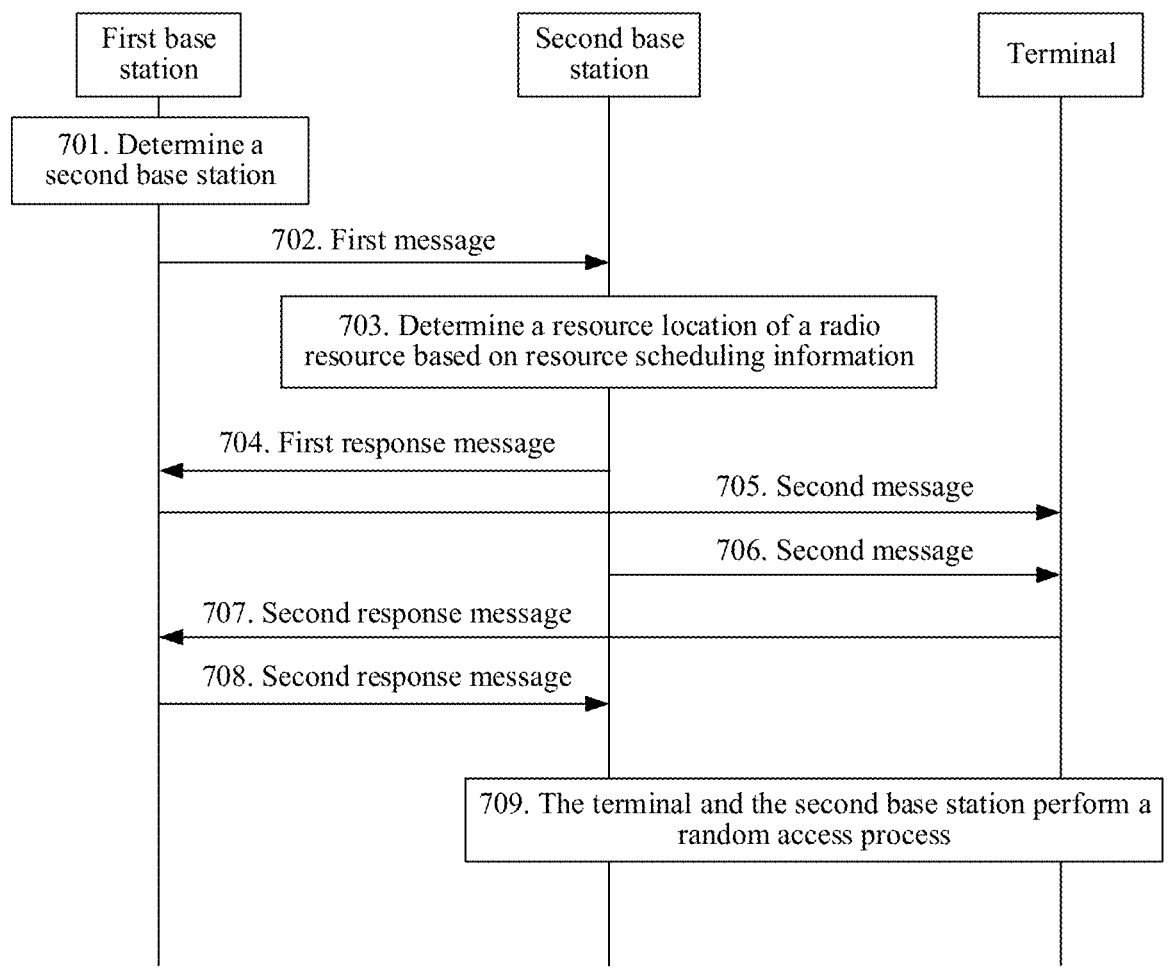
FIG. 7A is another schematic communication diagram of a possible data transmission method according to an embodiment of this application.

FIG. 7A is another embodiment of a data transmission method according to an embodiment of this application, and data transmission of the user plane in this embodiment can be based on the 3C architecture, the method specifically includes:

701. A first base station determines a second base station.

702. The first base station sends a first message to the second base station.

703. The second base station determines a resource location of a radio resource based on resource scheduling information.

704. The second base station sends a first response message to the second base station.

705. The first base station sends a second message to a terminal.

706. The second base station sends the second message to the terminal.

707. The terminal sends a second response message to the first base station.

708. The first base station sends the second response message to the second base station.

709. The terminal and the second base station perform a random access process.

In the embodiment of this application, step 701 to step 709 are similar to step 601 to step 609 shown in FIG. 6, and details are not described herein again.

Similar to the embodiment shown in FIG. 6A, in actual application, to send/receive data packets, a data bearer needs to be established. In this application, the specific steps of implementing the coordinated transmission process of the multi-connectivity data plane based on the 3C architecture may include the following steps:

Step 1. A first base station sends a data packet to a second base station.

Figure 7B:
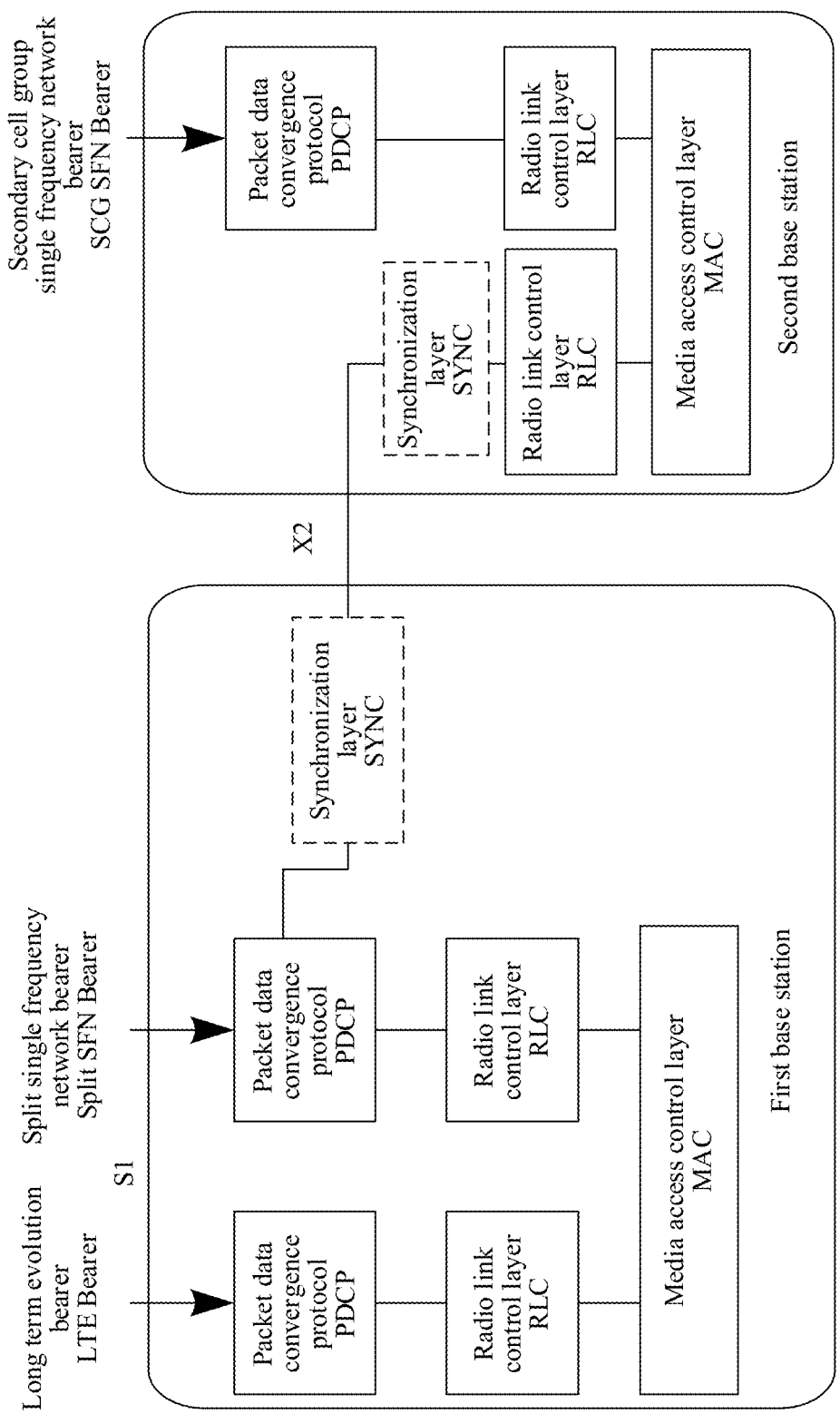
FIG. 7B is an architectural diagram of a possible protocol stack in 3C architecture according to an embodiment of this application.

In the 3C architecture, the first base station configures the second time synchronization information and sends the data packet to the second base station. The header of the data packet includes the second time synchronization information, and there are multiple implementations in which the header of the data packet includes the second time synchronization information in the 3C architecture. For example, FIG. 7B is possible protocol stack architecture in the 3C architecture provided by an embodiment of this application. A new protocol layer, such as a SYNC layer, can be added based on the existing protocol layer on the first base station, that is, the SYNC layer is added under the PDCP layer. The SYNC layer is used to indicate the second time synchronization information, that is, the first base station packages the to-be-transmitted PDCP data packet with a newly-added synchronization header (sync header). The sync header includes the second time synchronization information to be sent to the second base station. It should be understood that, if the SYNC layer is added to the first base station side, corresponding second base station side can add the SYNC layer on the RLC layer, to parse the second time synchronization information in the SYNC layer. Optionally, the second base station may not add the SYNC layer, and parse the second time synchronization information in the SYNC layer by directly using the existing protocol layer. Alternatively, the SYNC layer is added to the first base station, and the indication of the second time synchronization information is implemented on the existing protocol layer, for example, the PDCP layer, that is, the second time synchronization information is added to the PDCP data header, and the second base station obtains the second time synchronization information by parsing the PDCP data header. Therefore, a specific manner of indicating the second time synchronization information is not limited herein.

Step 2. The second base station obtains the second time synchronization information.

After receiving the data packet sent by the first base station, the second base station parses the header of the data packet before the scheduling period to obtain the second time synchronization information. It needs to be noted that, if the data packet includes a newly-added synchronization header, the second base station can parse through corresponding newly-added protocol layer, that is, parse through the SYNC layer added to the original RLC layer. Optionally, the second base station can also obtain the second time synchronization information by direct parsing through the RLC layer, that is, the function of parsing the SYNC layer needs to be added to the existing RLC layer. If the second time synchronization information is included in the header of the PDCP data packet, after the RLC layer received by the second base station receives the PDCP data packet, the second time synchronization information is obtained by parsing through the RLC layer, that is, the function of parsing the synchronization information in the PDCP data packet needs to be added to the RLC layer of the second base station. Therefore, the first base station and the second base station use the same MCS and resource scheduling period to transmit data at the time at which the second time synchronization information indicates and at the resource location of the downlink radio resource, so that same data can be sent at the same time and at the same frequency by the first base station and the second base station. Optionally, when the first base station does not send the resource scheduling period to the second base station, the first base station notifies the second base station before scheduling the resource each time, so that the first base station and the second base station send the same data to the terminal at the same time and at the same frequency.

In the process of coordinated data transmission in this embodiment, if the resource scheduling information is updated, the first base station and the second base station need to restart the coordinated data transmission process.

For data retransmission that may occur during data transmission, the first base station and the second base station may determine to retransmit according to a result whether the data fed back by the terminal is correctly received, thereby ensuring reliability of downlink data transmission. For the retransmitted data packet, the embodiments of this application may not only use similar manner of retransmitting data packets provided in step 5 in the coordinated transmission process of the data plane in the 1A or MFSFN architecture shown in FIG. 6A, but may also use the following manner, including:

The feedback received by the first base station sent by the terminal is similar to the feedback in step 5, and the feedback may be at least one of an ACK message, an NACK message, or a DTX message. When the feedback received by the first base station is the NACK or the DTX, the first base station sends a number of the to-be-retransmitted data packet to the second base station, and the first base station further sends information, such as the resource scheduling information, the MCS, and the resource scheduling period, to the second base station. The information may be carried in an existing signaling message sent by the first base station to the second base station, or may be a new message. This is not limited in this application. Optionally, after receiving the information, the second base station returns an acknowledgement message to the first base station, where the acknowledgement message may be carried in the existing signaling message sent by the second base station to the first base station, or may be a new message. This is not limited in this application. The first base station configures the third time synchronization information. The data packet sent by the first base station to the second base station includes the third time synchronization information. After receiving the data packet, the second base station parses out the third time synchronization information, so that the first base station and the second base station use the same MCS and resource scheduling period to transmit data with the terminal at the time indicated by the third time synchronization information and at the resource location of the downlink radio resource, to enable the first base station and the second base station to send the same data to the terminal at the same time and at the same frequency.

In the embodiment of this application, the synchronous transmission process of the user plane data in the 3C architecture is described, and realizable implementations and applicable scenarios are added to the embodiment of this application, improving steps of the embodiment of this application.

Figure 8:
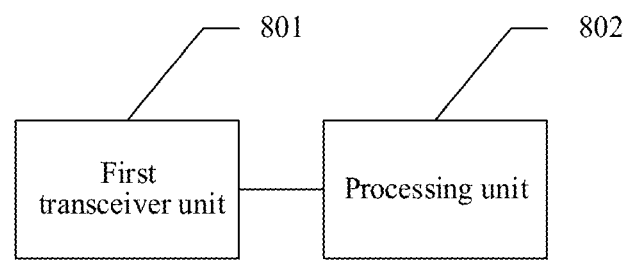
FIG. 8 is a schematic diagram of an embodiment of a possible second base station according to an embodiment of this application.

The foregoing describes the data transmission method in the embodiments of this application, and the following describes a base station in the embodiments of this application. FIG. 8 shows an embodiment of a base station in an embodiment of this application, the base station can perform operations of the second base station in the foregoing method embodiment, where the base station includes:

a first transceiver unit 801, configured to receive a first message from a first base station, where the first message is used to request a second base station to allocate a radio resource to a specific bearer, and the first message includes resource scheduling information;

a processing unit 802, configured to determine, based on the resource scheduling information, a resource location of the radio resource and schedule the radio resource, where the first transceiver unit 801 is further configured to send a first response message in response to the first message to the first base station.

In the embodiment of this application, on the basis of multi-connectivity data transmission, a first transceiver unit receives the first message of the first base station to establish transmission resource with the terminal and the processing unit obtains, through the first message, the resource scheduling information preset by a first terminal, and then determines to allocate a radio resource to the terminal, to implement multi-cell coordinated downlink transmission, thereby improving transmission efficiency of terminal data.

Figure 9:
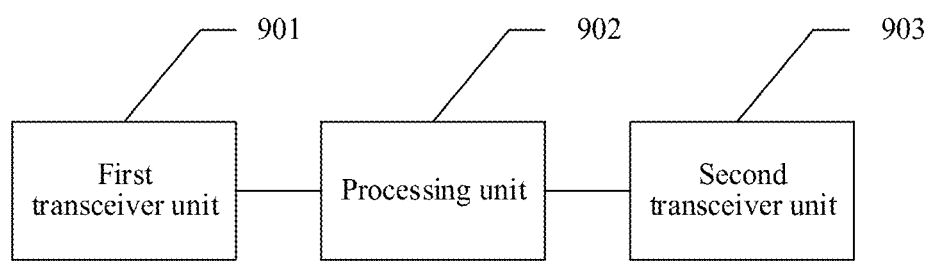
FIG. 9 is a schematic diagram of an embodiment of another possible second base station according to an embodiment of this application.

FIG. 9 is another embodiment of a base station according to an embodiment of this application. The base station can perform the operations of the second base station in the foregoing method embodiment. On the basis of FIG. 8, the first transceiver unit 901 is further configured to receive first time synchronization information from the first base station; or the first transceiver unit 901 is further configured to send the first time synchronization information to the first base station.

The first time synchronization information is used to indicate a time at which signaling transmission is started, and the first time synchronization information includes a subframe index or a timestamp.

Optionally, the second base station may further include:

a second transceiver unit 903, configured to send a second message to a terminal, where the second message includes radio resource configuration information determined by the second base station for the terminal, where the second transceiver unit 903 is further configured to receive a second response message from the terminal in response to the second message, where the second response message is used to indicate that the terminal has completed radio resource configuration.

Optionally, the second transceiver unit 903 is specifically configured to:

send the second message to the terminal at a time indicated by the first time synchronization information and at a resource location of the radio resource.

Optionally, the first transceiver unit 901 is specifically configured to:

receive the second response message sent by the first base station, where the second response message is sent by the terminal to the first base station; or after the receiving, by the second base station, a second response message from the terminal in response to the second message, the first transceiver unit 901 is further configured to:

send the second response message to the first base station.

Optionally, when a transmitted data packet is routed from the first base station to the second base station and to the terminal, the first transceiver unit 901 is further configured to receive the data packet from the first base station, where a header of the data packet includes second time synchronization information, the second time synchronization information is used to indicate a time at which the second base station starts data transmission, and the second time synchronization information includes a subframe index or a timestamp.

The processing unit 902 is further configured to obtain the second time synchronization information based on the data packet.

The second transceiver unit 903 is further configured to perform data transmission at a time indicated by the second time synchronization information and at a resource location of the radio resource.

Optionally, when a transmitted data packet is directly transmitted from a serving gateway to the second base station, the third transceiver unit 904 is further configured to receive a data packet from the serving gateway, where a header of the data packet includes the second time synchronization information, and the second time synchronization information is generated by the serving gateway.

The processing unit 902 is further configured to obtain the second time synchronization information based on the data packet.

The second transceiver unit 903 is further configured to perform data transmission at a time indicated by the second time synchronization information and at a resource location of the radio resource.

Optionally, when a transmitted data packet is directly transmitted from an MBMS gateway to the second base station, the fourth transceiver unit 905 is configured to receive a data packet from the MBMS gateway, where a header of the data packet includes second time synchronization information, and the second time synchronization information is generated by the MBMS gateway.

The processing unit 902 is further configured to obtain the second time synchronization information based on the data packet.

The second transceiver unit 903 is further configured to perform data transmission at a time indicated by the second time synchronization information and at a resource location of the radio resource.

It needs to be noted that, in the embodiment of this application, the first transceiver unit 901 is configured to support communications between base stations. The second transceiver unit 903 is configured to support communications between a base station and a terminal. The third transceiver unit 904 and the fourth transceiver unit 905 are configured to support communications between a base station and a serving gateway in different types of architecture. In actual application, the third transceiver unit 904 and the fourth transceiver unit 905 can be considered as one transceiver unit.

In the embodiment of this application, the first base station and the second base station implement synchronous transmission of control plane signaling and user plane data by using the first time synchronization information and the second time synchronization information, and by dynamically constructing logical cell groups, a plurality of second base stations are controlled by the first base station in a logical cell group to transmit data and signaling, thereby turning neighboring interference into useful signals, and improving downlink throughput rate of the terminal. To ensure synchronous transmission of control plane signaling and user plane data, multiple manners are provided to enable the first base station and the second base station to share the first time synchronization information used to synchronously transmit control plane signaling and the second time synchronization information used to synchronously transmit user plane data. For example, the first base station configures the first time synchronization information and sends the first time synchronization information to the second base station through the first message, or the second base station configures the first time synchronization information and sends the first time synchronization information to the first base station through the first response message. In addition, synchronous transmission processes of the user plane data in different types of architecture, such as the 1A, the 3C, and the MBSFN architecture, are described, adding realizable implementations and applicable scenarios to the embodiment of this application, thereby improving steps of the embodiment of this application.

Figure 10:
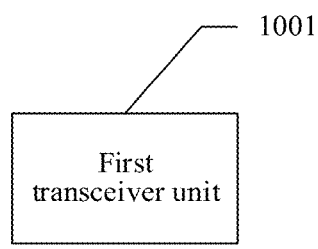
FIG. 10 is a schematic diagram of an embodiment of a possible first base station according to an embodiment of this application.

FIG. 10 is another embodiment of a base station according to an embodiment of this application. The base station can perform the operations in the foregoing method embodiment of the first base station, where the base station includes:

a first transceiver unit 1001, configured to send a first message to a second base station, where the first message is used to request the second base station to allocate a radio resource to a specific bearer, the first message includes resource scheduling information, and the resource scheduling information is used to indicate a resource location of the radio resource for the second base station, where the first transceiver unit 1001 is further configured to receive a first response message from the second base station, where the first response message is used to acknowledge that the radio resource has been allocated.

In the embodiments of this application, on the basis of multi-connectivity data transmission, the first transceiver unit sends the first message to the second base station to establish a transmission resource with the terminal, so that the second terminal obtains the resource scheduling information preset by a first terminal through the first message, and then the first transceiver unit receives the first response message sent by the second base station, to implement multi-cell coordinated downlink transmission, thereby improving transmission efficiency of terminal data.

Figure 11:
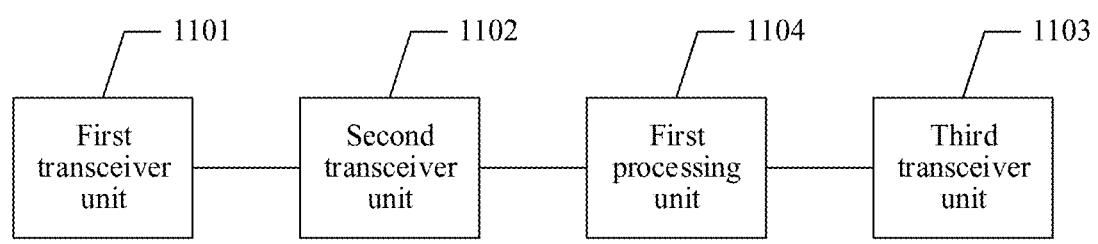
FIG. 11 is a schematic diagram of an embodiment of another possible first base station according to an embodiment of this application.

FIG. 11 is another embodiment of a base station according to an embodiment of this application. The base station can perform the operations in the foregoing method embodiment of the first base station. On the basis of FIG. 10, the first transceiver unit 1101 is further configured to receive first time synchronization information from the second base station; or the first transceiver unit 1101 is further configured to send the first time synchronization information to the second base station.

The first time synchronization information is used to indicate a time at which signaling transmission is started, and the first time synchronization information includes a subframe index or a timestamp.

Optionally, the base station may further include:

a second transceiver unit 1102, configured to send a second message to a terminal, where the second message includes radio resource configuration information determined by the second base station for the terminal, where the second transceiver unit 1102 is further configured to receive a second response message from the terminal in response to the second message, where the second response message is used to indicate that the terminal has completed radio resource configuration.

Optionally, the second transceiver unit 1102 is specifically configured to send the second message to the terminal at a time indicated by the first time synchronization information and at the resource location of the radio resource.

Optionally, the second transceiver unit 1102 is specifically configured to:

send the second message to the terminal at a time indicated by the first time synchronization information and at a resource location of the radio resource.

Optionally, the first transceiver unit 1101 is further configured to:

receive the second response message sent by the second base station, where the second response message is sent by the terminal to the second base station; or after the receiving, by the first base station, a second response message from the terminal in response to the second message, the first transceiver unit 1101 is further configured to:

send the second response message to the second base station.

Optionally, when a transmitted data packet is routed from the first base station to the second base station and to the terminal, the base station further includes:

the first transceiver unit 1101 is further configured to send the data packet to the second base station, where a header of the data packet includes second time synchronization information, the second time synchronization information is used to indicate a time at which the second base station starts data transmission, and the second time synchronization information includes a subframe index or a timestamp; and the second transceiver unit 1102 is further configured to perform data transmission at a time indicated by the second time synchronization information and at a resource location of the radio resource.

Optionally, when a transmitted data packet is directly transmitted from a serving gateway to the second base station, the base station further includes a third transceiver unit 1103 and a first processing unit 1104.

The third transceiver unit 1103 is configured to receive a data packet from the serving gateway, where a header of the data packet includes second time synchronization information, and the second time synchronization information is generated by the serving gateway.

The first processing unit 1104 is configured to obtain the second time synchronization information based on the data packet.

The second transceiver unit 1102 is configured to perform data transmission at a time indicated by the second time synchronization information and at a resource location of the radio resource.

Optionally, when a transmitted data packet is directly transmitted from an MBMS gateway to the second base station, the base station further includes a fourth transceiver unit 1105 and a second processing unit 1106.

The fourth transceiver unit 1105 is configured to receive a data packet from the MBMS gateway, where a header of the data packet includes second time synchronization information, and the second time synchronization information is generated by the MBMS gateway.

The second processing unit 1106 is further configured to obtain the second time synchronization information based on the data packet.

The second transceiver unit 1102 is further configured to perform data transmission at a time indicated by the second time synchronization information and at a resource location of the radio resource.

In the embodiment of this application, the first transceiver unit 1101 is configured to support communications between base stations. The second transceiver unit 1102 is configured to support communications between the base station and the terminal. The third transceiver unit 1103 and the fourth transceiver unit 1105 are configured to support communications between the base station and the serving gateway in different architectures. The first processing unit 1104 and the second processing unit 1106 are configured to support control management of actions of the second base station in different architectures. In actual application, the third transceiver unit 1103 and the fourth transceiver unit 1105 can be considered as a same transceiver unit, and the first processing unit 1104 and the second processing unit 1106 can be considered as a same processing unit.

In the embodiments of this application, the first base station and the second base station implement synchronous transmission of control plane signaling and user plane data by using the first time synchronization information and the second time synchronization information, and by dynamically constructing a logical cell group, a plurality of second base stations are controlled by the first base station in the logical cell group to transmit data and signaling, thereby turning neighboring interference into useful signals, and improving downlink throughput rate of the terminal. To ensure synchronous transmission of control plane signaling and user plane data, multiple manners are provided to enable the first base station and the second base station to share the first time synchronization information used to synchronously transmit control plane signaling and the second time synchronization information used to synchronously transmit user plane data. For example, the first base station configures the first time synchronization information and sends the first time synchronization information to the second base station through the first message, or the second base station configures the first time synchronization information and sends the first time synchronization information to the first base station through the first response message. In addition, the synchronous transmission processes of the user plane data in the different architectures, such as the 1A, the 3C, and the MBSFN architecture, are described, adding realizable implementations and applicable scenarios to the embodiment of this application, thereby improving steps of the embodiment of this application.

FIG. 8 to FIG. 11 respectively describe the second base station and the first base station in the embodiments of this application in detail from the perspective of the modularization functional entity, and the second base station and the first base station in the embodiments of this application are described in detail from the perspective of hardware processing.

Figure 12:
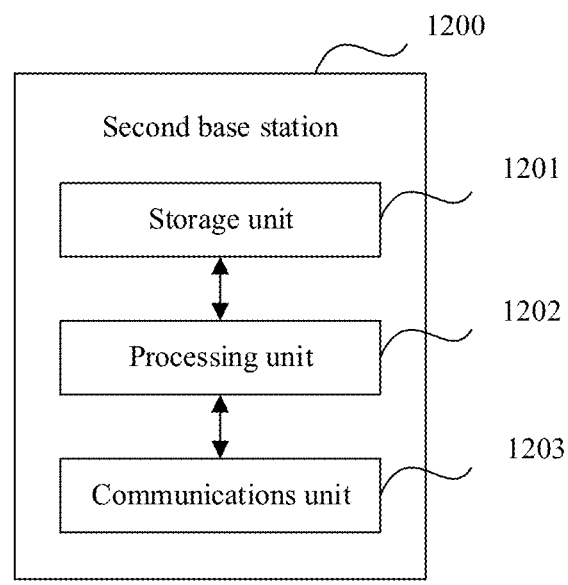
FIG. 12 is a schematic block diagram of a second base station according to an embodiment of this application.

FIG. 12 is a schematic structural diagram of a second base station according to an embodiment of this application. When an integrated unit is used, FIG. 12 is a possible schematic structural diagram of a second base station related in the foregoing embodiments. A second base station 1200 includes a processing unit 1202 and a communications unit 1203. The processing unit 1202 is configured to control and manage actions of the second base station. For example, the processing unit 1202 is configured to support the second base station in performing step 402 in FIG. 4, step 503 and step 509 in FIG. 5, step 603 and step 609 in FIG. 6A, step 703 and step 709 in FIG. 7A, and/or another process used in the technology described in this specification. The communications unit 1203 is configured to support communications between the second base station and other devices. For example, the communications unit 1203 is configured to support the second base station in performing step 401 and step 403 in FIG. 4, step 502, step 504, step 506 and step 508 in FIG. 5, step 602, step 604, step 606, and step 608 in FIG. 6A, and step 702, step 704, step 706 and step 708 in FIG. 7A. The second base station may further include a storage unit 1201, configured to store a program code and data of the base station.

The processing unit 1202 may be a processor or a controller, and for example, may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The controller/processor may implement or execute various example logical blocks, modules, and circuits described with reference to content disclosed in this application. The processor may alternatively be a combination of computing functions, for example, a combination of one or more microprocessors or a combination of a DSP and a microprocessor. The communications unit 1203 may be a communications interface, a transceiver, a transceiver circuit, or the like. The communications interface is a general term and may include one or more interfaces, for example, a transceiver interface. The storage unit 1201 may be a memory.

Figure 13:
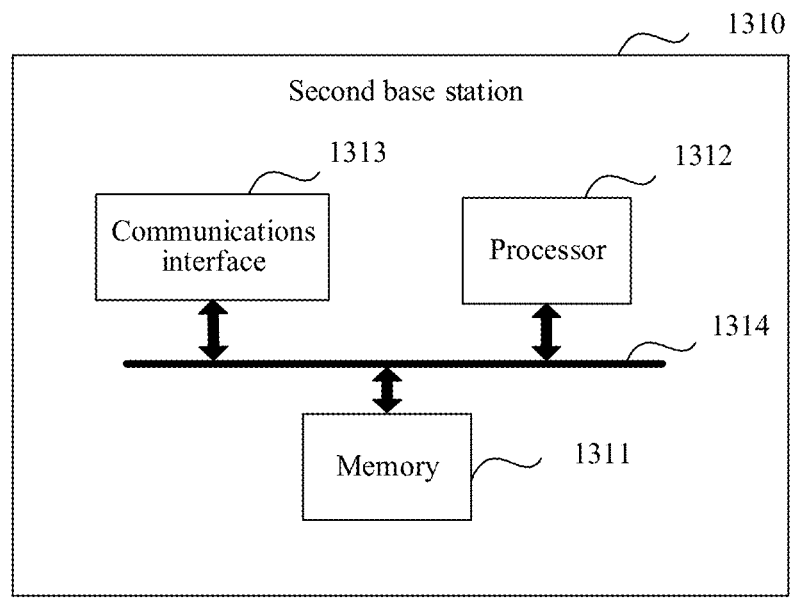
FIG. 13 is a schematic structural diagram of a second base station according to an embodiment of this application.

When the processing unit 1002 is a processor, the communications unit 1203 is a communications interface, and the storage unit 1201 is a memory, the base station related in this embodiment of this application may be the second base station shown in FIG. 13.

Referring to FIG. 13, a base station 1310 includes a processor 1312, a communications interface 1313, and a memory 1311. Optionally, the base station 1310 may further include a bus 1314. The communications interface 1313, the processor 1312, and the memory 1311 are interconnected by using the bus 1314. The bus 1314 may be a peripheral component interconnect (PCI) bus, an extended industry standard architecture (EISA) bus, or the like. The bus 1314 may be classified into an address bus, a data bus, a control bus, and the like. For convenience of illustration, in FIG. 13, only one thick line is used for illustration, but it does not mean that there is only one bus or one type of bus.

The steps performed by the second base station in the foregoing embodiment may be based on the structure of the second base station shown in FIG. 13.

Figure 14:
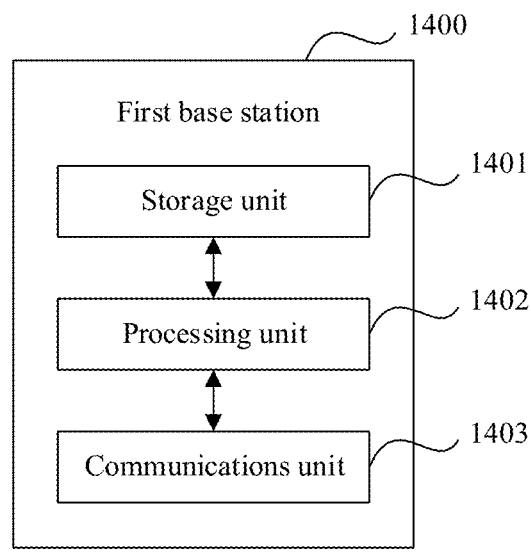
FIG. 14 is a schematic block diagram of a first base station according to an embodiment of this application.

FIG. 14 is a schematic structural diagram of a first base station according to an embodiment of this application. When an integrated unit is used, FIG. 14 is a possible schematic structural diagram of a first base station related in the foregoing embodiments. A first base station 1400 includes a processing unit 1402 and a communications unit 1403. The processing unit 1402 is configured to control and manage actions of the first base station. For example, the processing unit 1402 is configured to support the first base station in performing step 501 in FIG. 5, step 601 in FIG. 6A, step 701 in FIG. 7A, and/or another process used in the technology described in this specification. The communications unit 1403 is configured to support communications between the first base station and another device. For example, the communications unit 1403 is configured to support the first base station in performing step 401 and step 403 in FIG. 4, step 502, step 504, step 505, step 507, and 508 in FIG. 5, step 602, step 604, step 605, step 607, step 608, step 610 and step 613 in FIG. 6A, and step 702, step 704, step 705, step 707, and step 708 in FIG. 7A. The first base station may further include a storage unit 1401, configured to store program code and data of the base station.

The processing unit 1402 may be a processor or a controller, and for example, may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The controller/processor may implement or execute various example logical blocks, modules, and circuits described with reference to content disclosed in this application. The processor may alternatively be a combination of computing functions, for example, a combination of one or more microprocessors or a combination of a DSP and a microprocessor. The communications unit 1403 may be a communications interface, a transceiver, a transceiver circuit, or the like. The communications interface is a general term and may include one or more interfaces, for example, a transceiver interface. The storage unit 1401 may be a memory.

When the processing unit 1402 is a processor, the communications unit 1403 is a communications interface, and the storage unit 1401 is a memory, the base station related in this embodiment of this application may be the first base station shown in FIG. 14.

Figure 15:
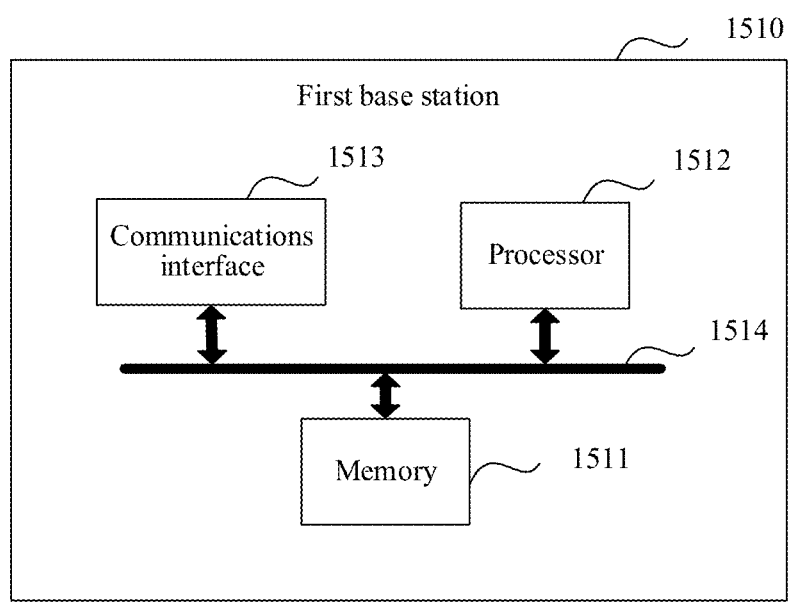
FIG. 15 is a schematic structural diagram of a first base station according to an embodiment of this application.

Referring to FIG. 15, a base station 1510 includes a processor 1512, a communications interface 1513, and a memory 1511. Optionally, the base station 1510 may further include a bus 1514. The communications interface 1513, the processor 1512, and the memory 1511 are interconnected by using the bus 1514. The bus 1514 may be a peripheral component interconnect (PCI) bus, an extended industry standard architecture (EISA) bus, or the like. The bus 1514 may be classified into an address bus, a data bus, a control bus, and the like. For convenience of illustration, in FIG. 15, only one thick line is used for illustration, but it does not mean that there is only one bus or one type of bus.

The steps performed by the first base station in the foregoing embodiment may be based on the structure of the first base station shown in FIG. 15.

An embodiment of this application further provides an apparatus. The apparatus may be a chip. The apparatus includes a processor and the memory, where the memory is configured to store an instruction, and the processor is configured to perform the instruction stored in the memory, so that the apparatus performs some or all of the steps of the second base station in the data transmission method in the embodiment of FIG. 4 to FIG. 7A, for example, step 402 in FIG. 4, step 503 and step 509 in FIG. 5, step 603 and step 609 in FIG. 6A and step 703 and step 709 in FIG. 7A and/or other processes used in the technology described in this application.

An embodiment of this application further provides an apparatus. The apparatus may be a chip. The apparatus includes a processor and the memory, where the memory is configured to store an instruction, and the processor is configured to perform the instruction stored in the memory, so that the apparatus performs some or all of the steps of the first base station in the data transmission method in the embodiment of FIG. 4 to FIG. 7A, for example, step 501 in FIG. 5, step 601 in FIG. 6A and step 701 in FIG. 7A and/or other processes used in the technology described in this application.

An embodiment of this application further provides a system. The system includes one or more central processing units 1622 and memories 1632, one or more storage mediums 1630 (for example, one or more massive storage devices) storing an application program 1642 or data 1644. The memory 1632 and the storage medium 1630 may be transient storage or persistent storage. The program stored in the storage medium 1630 may include one or more modules (not shown in the figure), and each module may include a series of instructions and operations for the system. Further, the central processing unit 1622 may be configured to communicate with the storage medium 1630, and perform a series of instruction operations in the storage medium 1630 in the base station 1600. The system 1600 may further include one or more power supplies 1626, one or more wired or wireless network interfaces 1650, one or more input/output interfaces 1658, and/or one or more operating systems 1641, for example, Windows Server, Mac OS X, Unix, Linux, or FreeBSD.

Figure 16:
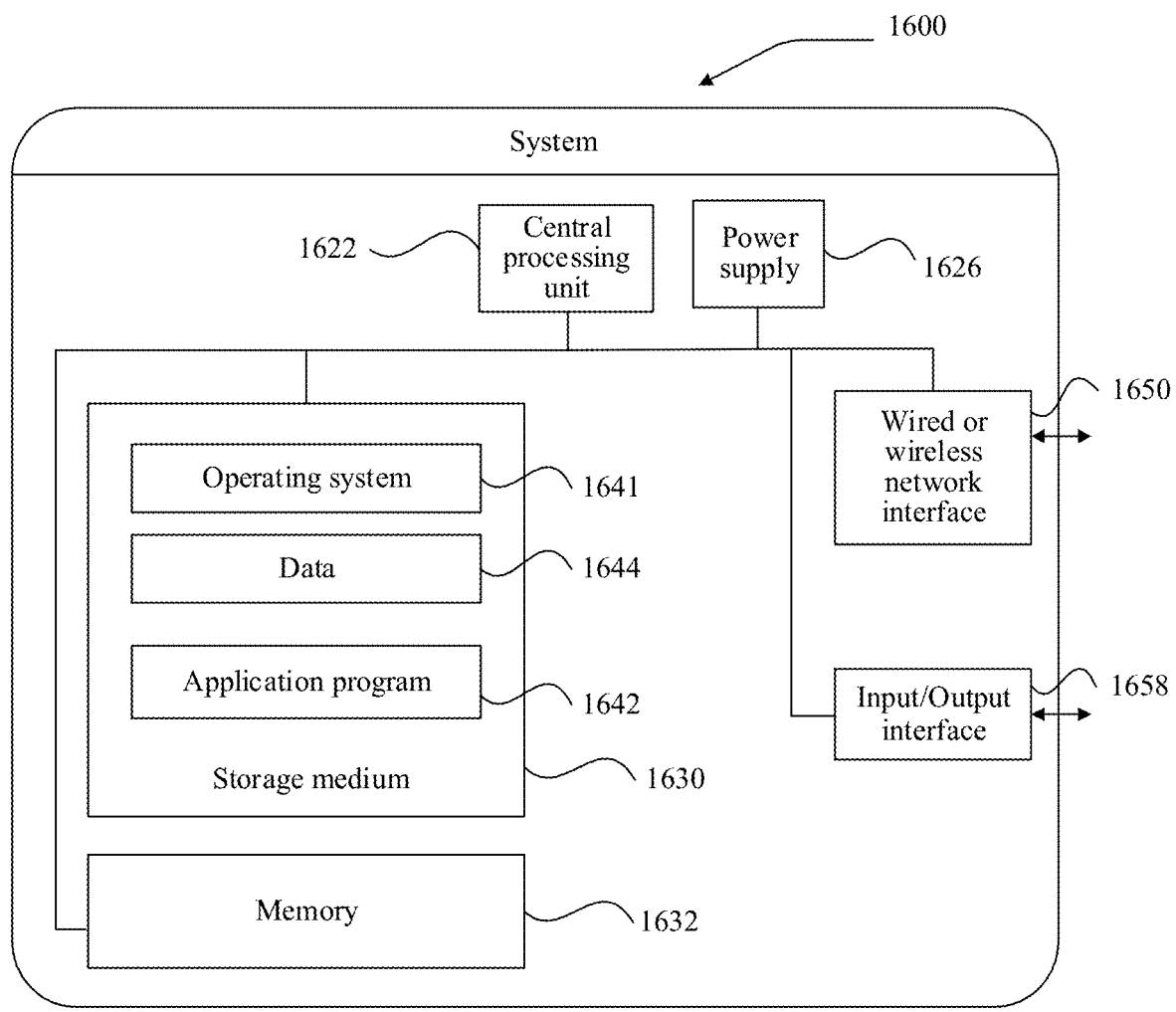
FIG. 16 is a schematic structural diagram of a system according to an embodiment of this application.

The data transmission method embodiment described in FIG. 4 to FIG. 7A may be implemented based on the system structure shown in FIG. 16.

All or some of the foregoing embodiments may be implemented by using software, hardware, firmware, or any combination thereof. When software is used to implement the embodiments, all or some of the embodiments may be implemented in a form of a computer program product.

The computer program product includes one or more computer instructions. When the computer program instruction is loaded and executed on a computer, all or some of the procedures or functions according to the embodiments of this application are generated. The computer may be a general-purpose computer, a special-purpose computer, a computer network, or another programmable device. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable mediums. The usable medium may be a magnetic medium (for example, a floppy disk, a hard disk, or a magnetic tape), an optical medium (for example, a DVD), a semiconductor medium (for example, a solid state disk (SSD)), or the like.

It may be clearly understood by a person skilled in the art that, for the purpose of convenient and brief description, for a detailed working process of the foregoing system, device, and unit, reference may be made to a corresponding process in the foregoing method embodiments, and details are not described herein again.

In the several embodiments provided in this application, it should be understood that the disclosed system, device, and method may be implemented in other manners. For example, the described device embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the devices or units may be implemented in electronic, mechanical, or other forms.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit. The integrated unit can be implemented in a form of hardware, or can be implemented in a form of a software functional unit.

When the integrated unit is implemented in the form of a software functional unit and sold or used as an independent product, the integrated unit may be stored in a computer readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended to describe the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A data transmission method, comprising:
receiving, by a second base station, a first message from a first base station, wherein the first message is used to request the second base station to allocate a radio resource to a specific bearer, and the first message comprises resource scheduling information;
determining, by the second base station, based on the resource scheduling information, a resource location of the radio resource and scheduling the radio resource;
sending, by the second base station, a first response message in response to the first message to the first base station;
receiving, by the second base station, first time synchronization information from the first base station or sending, by the second base station, the first time synchronization information to the first base station; and
sending, by the second base station and synchronously with the first base station, a second message to a terminal at a time indicated by the first time synchronization information and at the resource location of the radio resource.

2. The data transmission method according to claim 1, wherein the first time synchronization information comprises a subframe index or a timestamp.

3. The data transmission method according to claim 1, wherein the second message comprises radio resource configuration information determined by the second base station for the terminal and the method further comprises:
receiving, by the second base station, a second response message from the terminal in response to the second message, wherein the second response message is used to indicate that the terminal has completed radio resource configuration.

4. The data transmission method according to claim 3, wherein
the receiving, by the second base station, a second response message from the terminal in response to the second message comprises: receiving, by the second base station, the second response message from the first base station, wherein the second response message is sent by the terminal to the first base station; or
after the receiving, by the second base station, a second response message from the terminal in response to the second message, the method further comprises: sending, by the second base station, the second response message to the first base station.

5. The data transmission method according to claim 1, the method further comprising:
routing a transmitted data packet from the first base station to the second base station and to a terminal;
receiving, by the second base station, the data packet from the first base station, wherein a header of the data packet comprises second time synchronization information, the second time synchronization information is used to indicate a time at which the second base station starts data transmission, and the second time synchronization information comprises a subframe index or a timestamp;
obtaining, by the second base station, the second time synchronization information based on the data packet; and
performing, by the second base station, data transmission at a time indicated by the second time synchronization information and at a resource location of the radio resource.

6. The data transmission method according to claim 1, wherein a data packet is directly transmitted from a serving gateway to the second base station and the method further comprises:
receiving, by the second base station, a data packet from a serving gateway, wherein a header of the data packet comprises second time synchronization information, and the second time synchronization information is generated by the serving gateway;
obtaining, by the second base station, the second time synchronization information based on the data packet; and
performing, by the second base station, data transmission at a time indicated by the second time synchronization information and at the resource location of the radio resource.

7. The data transmission method according to claim 1, wherein a transmitted data packet is directly transmitted from a multimedia broadcast multicast service (MBMS) gateway to the second base station and the method further comprises:
receiving, by the second base station, the data packet from the MBMS gateway, wherein a header of the data packet comprises second time synchronization information, and the second time synchronization information is generated by the MBMS gateway;
obtaining, by the second base station, the second time synchronization information based on the data packet; and
performing, by the second base station, data transmission at a time indicated by the second time synchronization information and at the resource location of the radio resource.

8. The data transmission method according to claim 1, wherein the resource scheduling information carries a resource block (RB) sequence number or an RB location, a resource scheduling period, and a modulation and coding scheme (MCS).

9. A data transmission method, comprising:
sending, by a first base station, a first message to a second base station, wherein the first message is used to request the second base station to allocate a radio resource to a specific bearer, the first message comprises resource scheduling information, and the resource scheduling information is used to indicate a resource location of the radio resource for the second base station;
receiving, by the first base station, a first response message from the second base station in response to the first message, wherein the first response message is used to acknowledge that the radio resource has been allocated;
sending, by the first base station, first time synchronization to the second base station or receiving, by the first base station, the first time synchronization information from the second base station; and
sending, by the first base station and synchronously with the second base station, a second message to a terminal at a time indicated by the first time synchronization information and at the resource location of the radio resource.

10. The data transmission method according to claim 9, wherein:
the first message further comprises first time synchronization information; or
the first response message comprises the first time synchronization information, wherein the first time synchronization information comprises a subframe index or a timestamp.

11. The data transmission method according to claim 9, wherein the second message comprises radio resource configuration information determined by the second base station for the terminal and the method further comprises:
receiving, by the first base station, a second response message from the terminal in response to the second message, wherein the second response message is used to indicate that the terminal has completed radio resource configuration.

12. The data transmission method according to claim 11, wherein
the receiving, by the first base station, a second response message from the terminal in response to the second message comprises:
receiving, by the first base station, the second response message sent by the second base station, and the second response message is sent by the terminal to the second base station; or
after the receiving, by the first base station, a second response message from the terminal in response to the second message, the method further comprises:
sending, by the first base station, the second response message to the second base station.

13. The data transmission method according to claim 9, the method further comprising:
routing a transmitted data packet from the first base station to the second base station and to a terminal;
sending, by the first base station, the data packet to the second base station, wherein a header of the data packet comprises second time synchronization information, wherein the second time synchronization information comprises a subframe index or a timestamp;
performing, by the first base station, data transmission at a time indicated by the second time synchronization information and at the resource location of the radio resource.

14. The data transmission method according to claim 9, wherein a transmitted data packet is directly transmitted from a serving gateway to the second base station and the method further comprises:
receiving, by the first base station, a data packet from the serving gateway, wherein a header of the data packet comprises second time synchronization information, and the second time synchronization information is generated by the serving gateway;

obtaining, by the first base station, the second time synchronization information based on the data packet; and performing, by the first base station, data transmission at a time indicated by the second time synchronization information and at the resource location of the radio resource.

15. The data transmission method according to claim 9, wherein a transmitted data packet is directly transmitted from a multimedia broadcast multicast service (MBMS) gateway to the second base station and the method further comprises:

receiving, by the first base station, a data packet from the MBMS gateway, wherein a header of the data packet comprises second time synchronization information, and the second time synchronization information is generated by the MBMS gateway;

obtaining, by the first base station, the second time synchronization information based on the data packet; and performing, by the first base station, data transmission at a time indicated by the second time synchronization information and at a resource location of the radio resource.

16. A base station, comprising:

a first transceiver unit, configured to receive a first message from a first base station, wherein the first message is used to request the base station to allocate a radio resource to a specific bearer, and the first message comprises resource scheduling information;

a processing unit, configured to determine, based on the resource scheduling information, a resource location of the radio resource and schedule the radio resource;

the first transceiver unit is further configured to:

send a first response message in response to the first message to the first base station; and receive first time synchronization information from the first base station or send the first time synchronization information to the first base station; and a second transceiver unit, configured to synchronously send with the first base station a second message to a terminal at a time indicated by the first time synchronization information and at the resource location of the radio resource.

17. The base station according to claim 16, wherein the first time synchronization information comprises a subframe index or a timestamp.

18. The base station according to claim 17, wherein the second message comprises radio resource configuration information determined by the second base station for the terminal and the second transceiver unit is further configured to:

receive a second response message from the terminal in response to the second message, wherein the second response message is used to indicate that the terminal has completed radio resource configuration.

* * * * *